United States Patent
Sauser et al.

(10) Patent No.: US 11,780,677 B2
(45) Date of Patent: Oct. 10, 2023

(54) MULTI-DECK, MULTI-ADJUST DIVERTER

(71) Applicant: Terex USA, LLC, Westport, CT (US)

(72) Inventors: Edwin J. Sauser, Monticello, IA (US); Albert D. Botton, Marion, IA (US); Gregory Young, Cedar Rapids, IA (US)

(73) Assignee: Terex USA, LLC, Westport, CT (US)

( * ) Notice: Subject to any disclaimer, the term of this patent is extended or adjusted under 35 U.S.C. 154(b) by 308 days.

(21) Appl. No.: 17/063,055

(22) Filed: Oct. 5, 2020

(65) Prior Publication Data

US 2021/0016970 A1     Jan. 21, 2021

Related U.S. Application Data

(62) Division of application No. 15/852,791, filed on Dec. 22, 2017, now Pat. No. 10,793,359, which is a division of application No. 14/645,632, filed on Mar. 12, 2015, now Pat. No. 9,849,461, which is a division of application No. 13/848,406, filed on Mar. 21, (Continued)

(51) Int. Cl.
| | |
|---|---|
| B65G 11/20 | (2006.01) |
| B02C 23/02 | (2006.01) |
| B02C 23/14 | (2006.01) |
| B07B 1/00 | (2006.01) |
| B07B 15/00 | (2006.01) |
| B65G 47/19 | (2006.01) |
| B65G 47/18 | (2006.01) |
| B02C 21/02 | (2006.01) |

(52) U.S. Cl.
CPC ............ *B65G 11/206* (2013.01); *B02C 21/02* (2013.01); *B02C 23/02* (2013.01); *B02C 23/14* (2013.01); *B07B 1/005* (2013.01); *B07B 15/00* (2013.01); *B65G 47/18* (2013.01); *B65G 47/19* (2013.01); *Y10T 29/49716* (2015.01)

(58) Field of Classification Search
CPC ...... B65G 11/206; B65G 47/18; B65G 47/19; B65G 47/20; B02C 21/02; B02C 23/02; B02C 23/10; B02C 23/14; B02C 23/16; B07B 1/005; B07B 15/00; Y10T 29/49716

See application file for complete search history.

(56) References Cited

U.S. PATENT DOCUMENTS

| | | |
|---|---|---|
| 876,687 A | 1/1908 | Brown |
| 1,354,747 A | 10/1920 | Hiller |
| (Continued) | | |

FOREIGN PATENT DOCUMENTS

GB    1328179 A    8/1973

OTHER PUBLICATIONS

Kolberg-Pioneer, Apr. 2004, entitled "Fast Pack a Mobile Asset for High Tonnage Producers a True 500 TPH Plant", 10-page brochure dated Apr. 2004.

*Primary Examiner* — Gene O Crawford
*Assistant Examiner* — Keith R Campbell
(74) *Attorney, Agent, or Firm* — Simmons Perrine Moyer Bergman PLC

(57) ABSTRACT

A compact modular mobile aggregate processing system configured with no stand-alone inter-plant conveyors for decreasing the footprint of the system and an infinitely adjustable flow diverter(s) for increasing the control of and variation of output characteristics of the system; the system further including specialized folding conveyors.

3 Claims, 25 Drawing Sheets

Related U.S. Application Data 2013, now Pat. No. 8,979,008, which is a division of application No. 13/429,819, filed on Mar. 26, 2012, now Pat. No. 8,403,147, which is a division of application No. 11/765,341, filed on Jun. 19, 2007, now Pat. No. 8,162,245.

(60) Provisional application No. 60/867,713, filed on Nov. 29, 2006, provisional application No. 60/805,548, filed on Jun. 22, 2006.

(56) References Cited

U.S. PATENT DOCUMENTS

| | | |
|---|---|---|
| 1,876,460 A | 9/1932 | Knipple |
| 2,179,747 A | 11/1939 | Malmsten |
| 2,605,076 A | 7/1952 | Tanke |
| 3,073,536 A | 1/1963 | Quinn |
| 3,409,235 A | 11/1968 | Quinn |
| 3,510,073 A | 5/1970 | Mailliard |
| 3,563,477 A | 2/1971 | Schroeder |
| 3,647,150 A | 3/1972 | Stephanek |
| 3,670,972 A | 6/1972 | Quinn |
| 3,841,570 A * | 10/1974 | Quinn ............ B02C 21/02 241/223 |
| 3,927,839 A | 12/1975 | Quinn |
| 4,585,179 A | 4/1986 | Tsuji et al. |
| 4,655,402 A | 4/1987 | Desourdy |
| 4,697,686 A | 10/1987 | West |
| 5,090,544 A | 2/1992 | Carroll |
| 5,251,832 A | 10/1993 | Hentschel |
| 5,647,545 A | 7/1997 | Conner |
| 5,664,907 A | 9/1997 | Betsinger |
| 5,887,698 A | 3/1999 | Soldavini |
| 6,119,847 A | 9/2000 | Mooney et al. |
| 6,626,608 B2 | 9/2003 | Olynyk |
| 6,698,594 B2 | 3/2004 | Cohen et al. |
| 6,708,814 B2 | 3/2004 | Wagstaffe |
| 6,935,587 B2 | 8/2005 | Brock et al. |
| 7,347,311 B2 | 3/2008 | Rudge |
| 7,464,889 B2 | 12/2008 | Westerman et al. |
| 7,534,074 B2 | 5/2009 | Kato |
| 7,675,824 B2 | 3/2010 | Kobayashi |
| 7,774,133 B2 | 8/2010 | Schwarzmann |
| 8,863,931 B2 | 10/2014 | Benoit et al. |
| 2003/0226919 A1 | 12/2003 | Brock et al. |
| 2005/0263626 A1 | 12/2005 | Brock et al. |
| 2010/0152998 A1 | 6/2010 | Schwarzmann |
| 2010/0300843 A1 | 12/2010 | Mustonen et al. |

\* cited by examiner

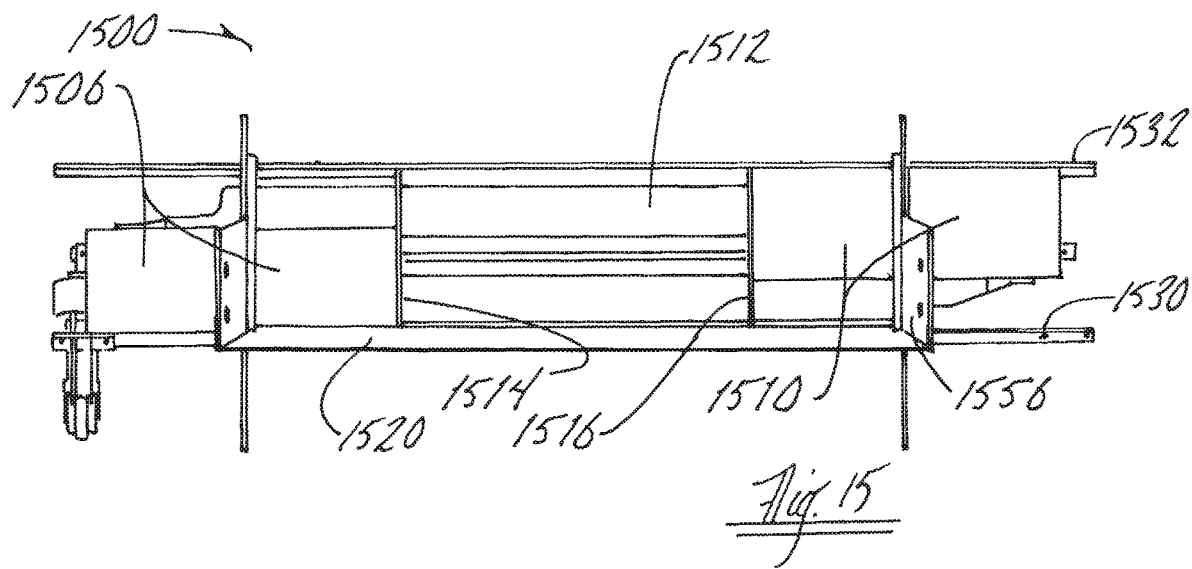
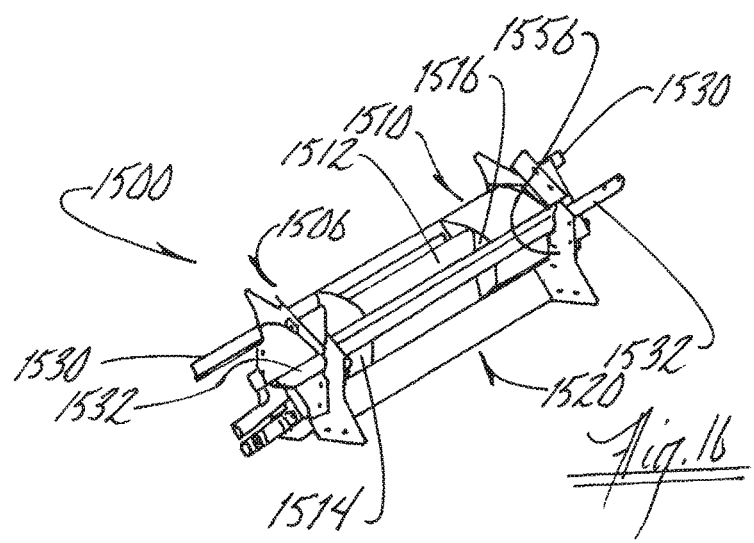

MULTI-DECK, MULTI-ADJUST DIVERTER

CROSS REFERENCE TO RELATED APPLICATIONS

This application claims the benefit of provisional application filed on Jun. 22, 2006 and having Ser. No. 60/805,548; and provisional application filed on Nov. 29, 2006 and having Ser. No. 60/867,713, which are hereby incorporated herein in their entirety by this reference. This application also claims the benefit of utility application filed on Jun. 19, 2007, having Ser. No. 11/765,341 and Issued U.S. Pat. No. 8,162,245; utility application filed on Mar. 26, 2012, having Ser. No. 13/429,819 and Issued U.S. Pat. No. 8,403,147; utility application filed on Mar. 12, 2013, having Ser. No. 13/848,406 and Issued U.S. Pat. No. 8,979,008; utility application filed on Mar. 12, 2015, having Ser. No. 14/645,632 and Issued U.S. Pat. No. 9,849,461; and utility application filed on Dec. 22, 2017, having Ser. No. 15/852,791, which are hereby incorporated herein in their entirety by this reference.

BACKGROUND OF THE INVENTION

This invention relates to aggregate processing systems, rock crushing plants and other road building material processing systems. More specifically, this invention relates to mobile rock crushing and aggregate processing plants which are capable of being transported over public highways.

Several techniques and numerous equipment arrangements for moving rock crushing and aggregate processing plants from one location to another are known from the prior art. Particularly relevant to the present invention is the use of modular aggregate processing and systems where the components of the entire system can be broken down and transported via semi-trucks to another location. Typically, the modular aggregate processing and rock crushing system would be designed to be broken down in numerous trailerable independent units, including road building material handling and processing equipment, such as crushers, trommels, screens, etc. and material transport equipment such as conveyors, augers, etc.

While such prior art modular mobile aggregate processing and rock crushing systems have enjoyed considerable success in the past, they do have some drawbacks. Such modular mobile aggregate processing and rock crushing system designs often resulted in considerable setup time and the use of many semi-tractors to pull all of the units.

One prior art system is described in U.S. Pat. No. 6,935,587 issued to Brock et al. This patent describes a modular aggregate processing and rock crushing system which utilizes many trailers to transport the system. Inter-crusher/processing module conveyor trailers were used to interconnect the various crushing or processing stations.

Consequently, a need remains in the industry for an improved modular mobile aggregate processing and rock crushing system which provides for reduced setup and delivery time and expense, as well as reduced space requirements (footprints) for the system itself.

SUMMARY OF THE INVENTION

It is an object of the invention to provide a compact system for blending aggregate material.

It is a feature of the present invention to utilize a sliding swing gate bending gate.

It is an advantage of the present invention to provide for compact adjust-ability of proportionally directing aggregate material.

Accordingly the present invention is:
A mobile screen comprising:
  a plurality of decks for separating aggregate material having differing dimensional characteristics;
  aggregate material diverter wherein flow of material therethrough is substantially aided by gravity;
  wherein said aggregate material diverter is an infinitely adjustable material diverter, capable of dividing input flows therein to a plurality of output flows; said infinitely adjustable material diverter comprises: a gate which is configured to move, in a first manner, to block, at least portions of a first passage, while permitting aggregate material to flow through a second passage; and said gate further configured to move, in a second manner, across an area below a material flow so that movement of said gate, in said second manner, results in an infinitely adjustable percentage of permissible flow through said first passage and said second passage; and
  a vehicular structure supporting said plurality of decks and said aggregate material diverter.
Additionally, the present invention is:
A mobile screen comprising:
  a stacked series of decks for separating aggregate material having differing dimensional characteristics;
  a series of aggregate material diverters wherein flow of material therebetween is substantially aided by gravity;
  wherein one of said series of aggregate material diverters is an infinitely adjustable material diverter, capable of dividing input therein to a plurality of output flows in any increment from all input to none of the input; and
  a vehicular structure supporting said stacked series of decks and said series of aggregate material diverters, where said vehicular structure is configured to be transported on a public highway.

BRIEF DESCRIPTION OF THE DRAWINGS

In one embodiment, the present invention comprises multiple crushers/screens which utilize on-board conveyors and further have multiple common feed and discharge points across the various multiple crushers/screens.

In the following description of the drawings, in which like reference numerals are employed to indicate like parts in the various views:

FIG. 15 is a top view of a sliding swing gate blending assembly of the present invention.

FIG. 16 is a top, front right side perspective view of the sliding swing gate blending assembly of FIG. 15, where the swing gate is disposed in an intermediate position between backward flow and forward flow.

FIG. 27 is a simplified cross-sectional drawing of the finishing screen of FIG. 26 where the dashed and dotted lines represent flows of materials through the screen.

DETAILED DESCRIPTION OF THE DRAWINGS

Figure 1:
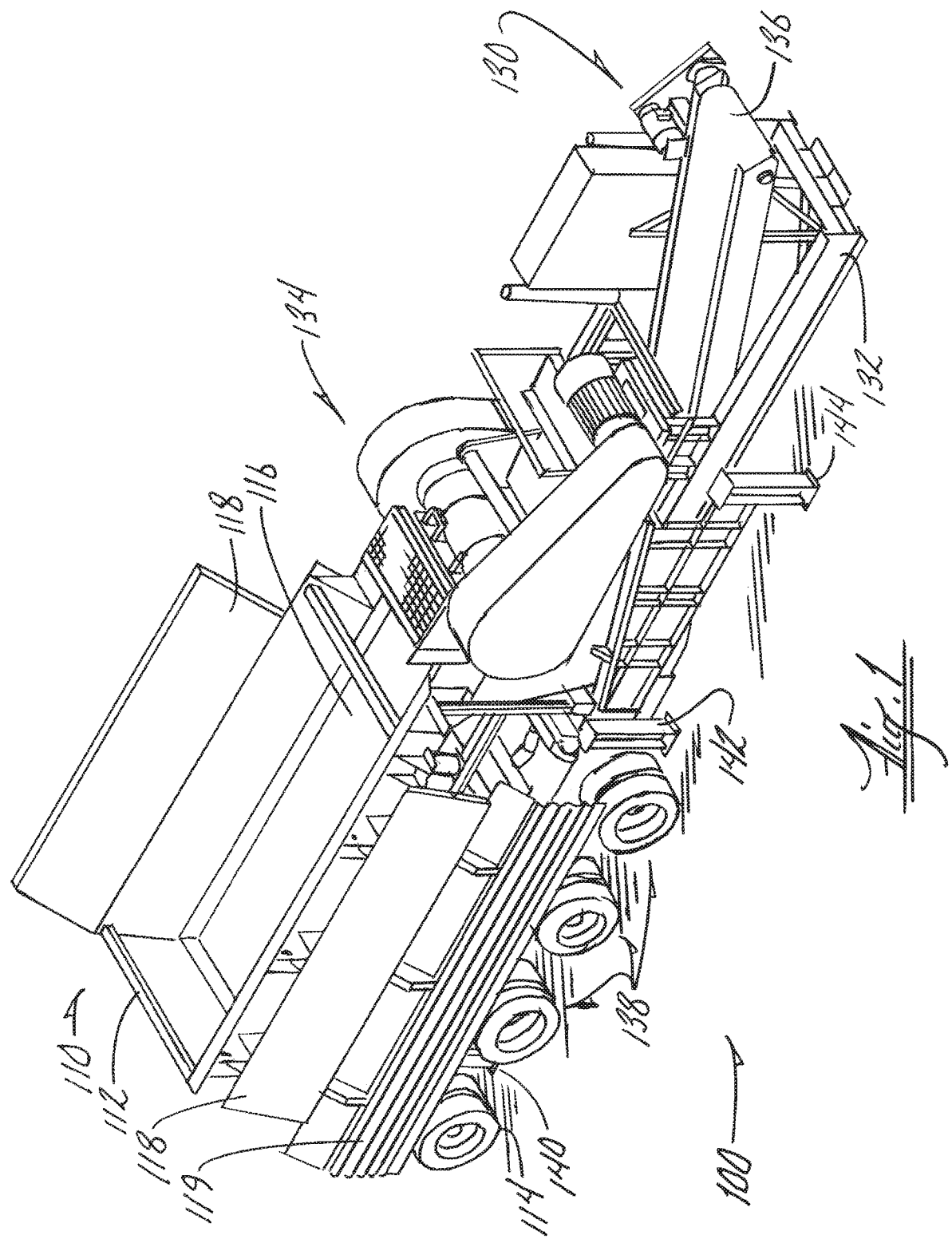
FIG. 1 is a perspective view of a mobile jaw rock crusher of this invention.

Referring now to the drawings, where like numerals refer to like matter throughout, and referring in greater detail, attention is first directed to FIG. 1, where there is shown a bifurcatable crusher 100, having a material feed section 110 disposed at a rear end of bifurcatable crusher 100 and a rock crusher section 130, which is disposed at the front end of the combined bifurcatable crusher 100. Material feed section 110 includes a material feeder section input hopper 112 with material feeder section conveyor 116 and material feeder section folding wings 118, which are used to extend the size of the dumping zone for the material feeder section input hopper 112. Folding stowable trailer misfeed protecting cover 119 is used to protect the trailer from damage caused by misfed material which is intended for the material feeder section input hopper 112, but falls outside the dumping zone and otherwise might strike the trailer. Folding stowable trailer misfeed protecting cover 119 can be folded and stowed during traveling as shown in the figures.

Material feed section 110 is shown with material feeder section trailer wheels 114. Rock crusher section 130 is shown with rock crusher section frame 132, rock crusher 134, rock crusher output conveyor 136, rock crusher trailer wheels 138, rock crusher trailer rear jack 140, rock crusher trailer middle jack 142, and rock crusher trailer front jack 144. When the bifurcatable crusher 100 is a unified structure, as shown in FIG. 1, it functions as a rock crusher where rocks, concrete and other materials known to be fed into a rock crusher are dropped into material feeder section input hopper 112 and fed by the material feeder section conveyor 116 into the rock crusher 134, where they are processed and output on rock crusher output conveyor 136. The bifurcatable crusher 100 is towable as a single non-intermediately articulating trailer.

Figure 2:
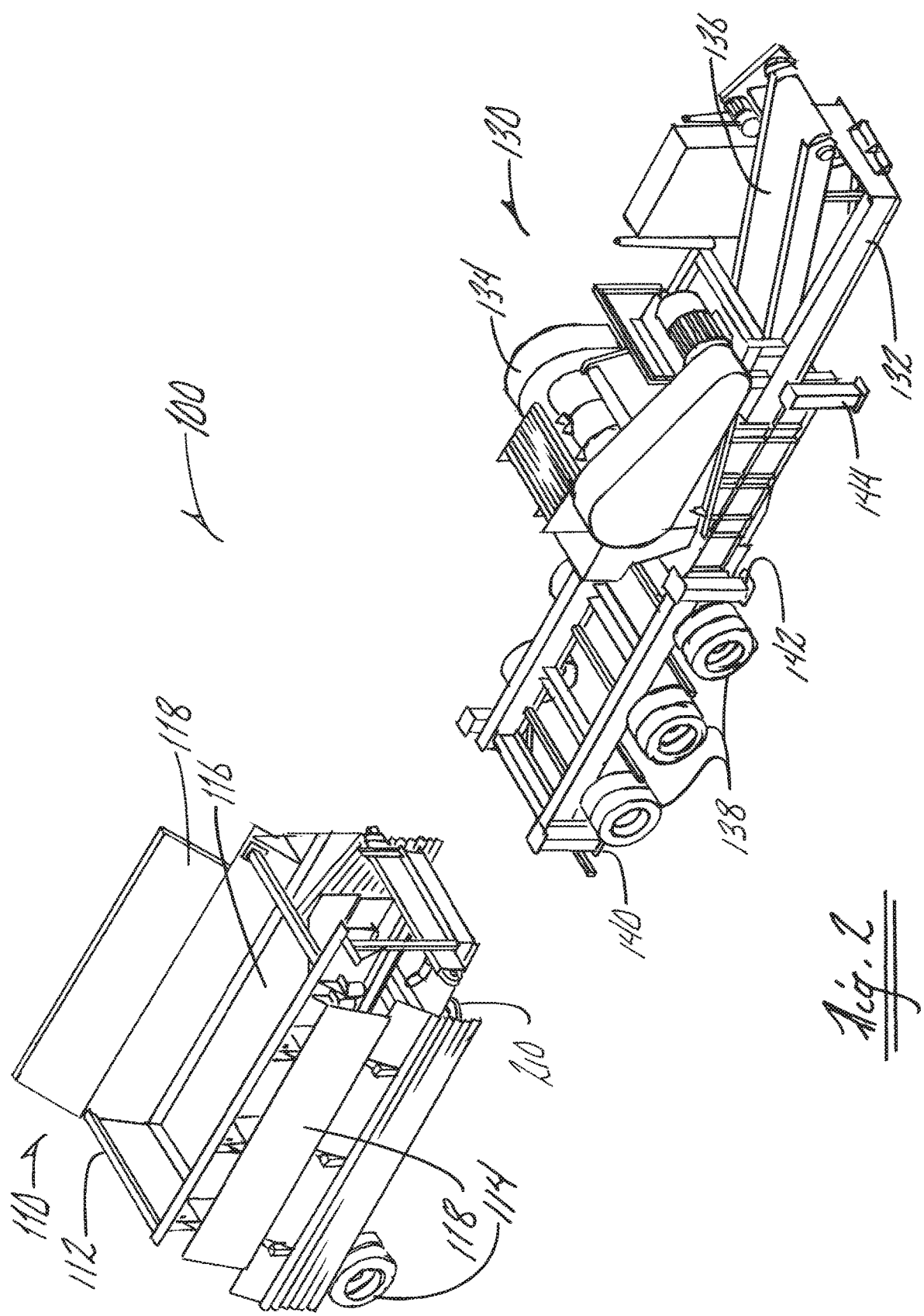
FIG. 2 is a partially exploded view of a mobile jaw rock crusher of FIG. 1.

Now referring to FIG. 2, there is shown the bifurcatable crusher 100 after it has been divided into separate material feed section 110 and rock crusher section 130. FIG. 2 shows a material feeder trailer jack 210 in a deployed position. Material feeder trailer jack 210 is preferably both retractable (length adjustable) and pivotable via hydraulic power.

Figure 3:
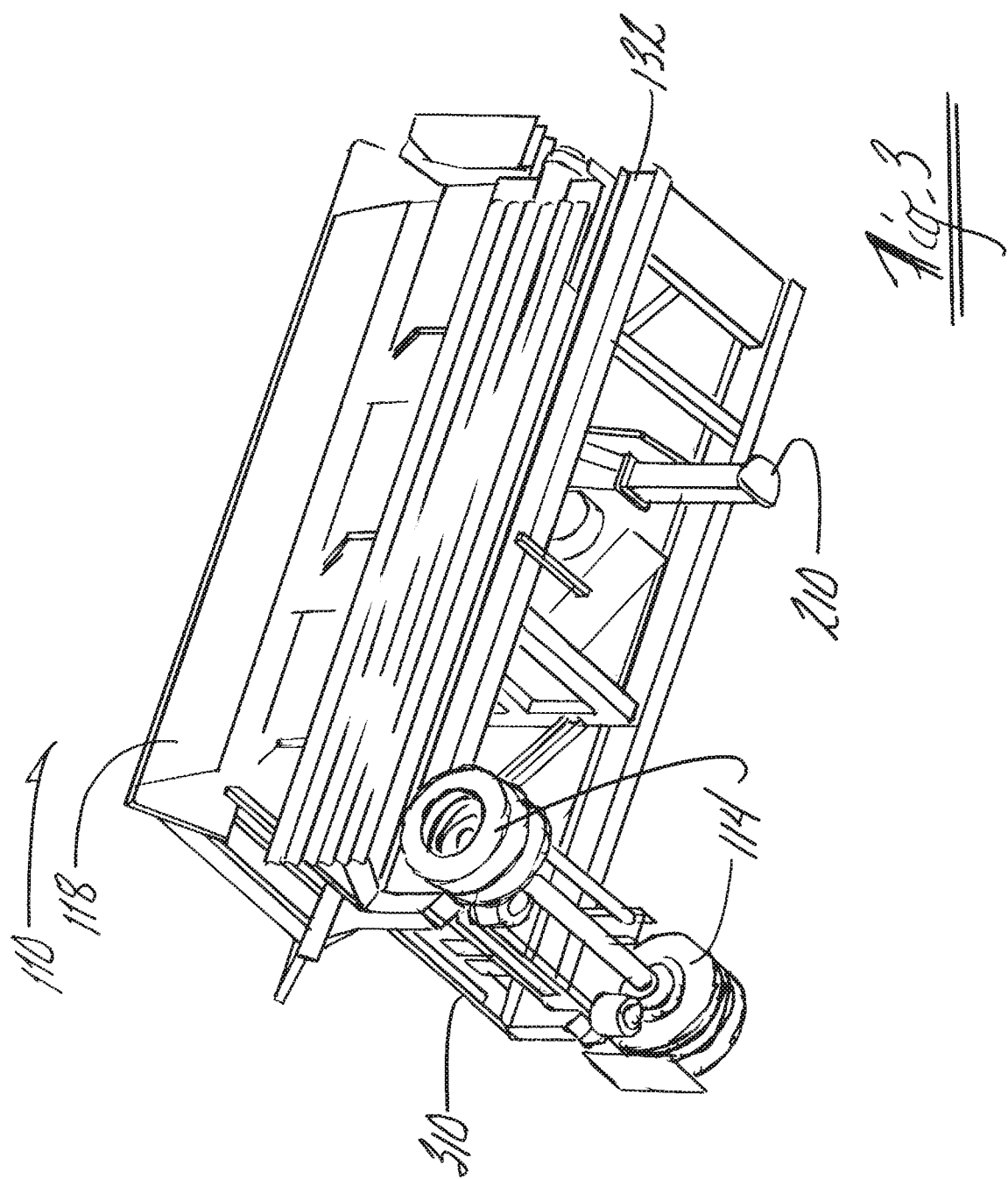
FIG. 3 is a perspective view of an underside portion of the mobile jaw rock crusher of FIGS. 1 and 2, where a stowable jack is shown in the deployed position.

Now referring to FIG. 3, there is shown a perspective view looking upward at the bottom of the material feed section 110, which shows the material feeder trailer jack 210 in a deployed position, and also shows the material feeder section gas-powered hydraulic pump 310, which is intended to provide hydraulic power to operate portions of the material feed section 110, such as the material feeder section folding wings 118, the folding stowable trailer misfeed protecting cover 119, folds material feeder trailer jack 210 and extends material feeder trailer jack 210.

Figure 4:
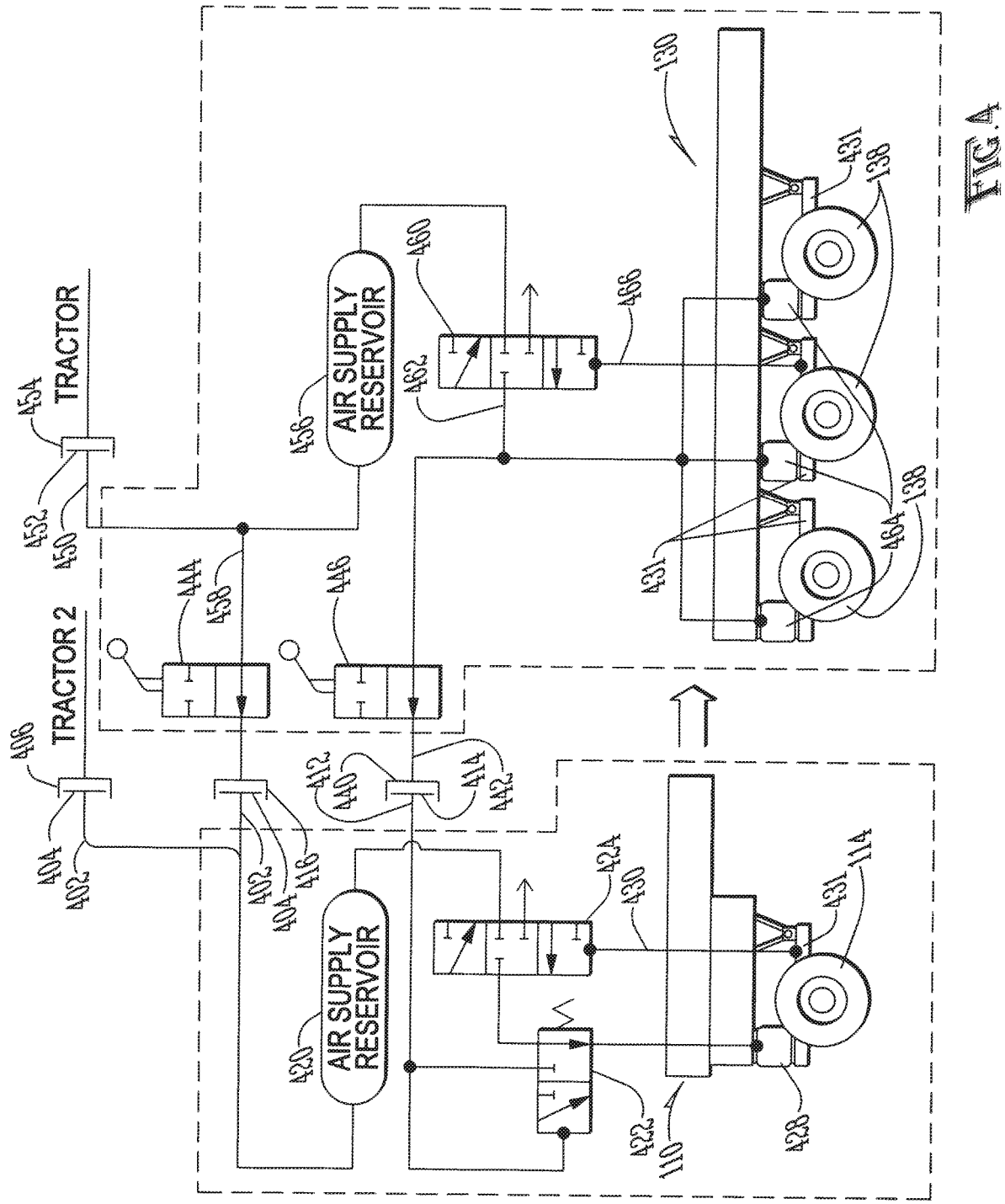
FIG. 4 is a schematic diagram of the pneumatic system of the present invention.

Now referring to FIG. 4, there is shown a pneumatic schematic diagram which is divided into two sections; the right section in the dashed lines represents the pneumatic structure on the rock crusher section 130, while the left side of FIG. 4 in the dashed line enclosure represents the pneumatic structure on the material feed section 110.

Referring to the left section of FIG. 4, there is shown an independent height adjustable air supply line 402 and an independent height adjustable air supply line quick coupler component 404. FIG. 4 shows two independent lines of differing length. In an alternate embodiment, one line could be used as the connection between independent height adjustable air supply line quick coupler component 404 and tractor-to-trailer air supply line quick connect coupler component 406. This connection would not occur at the same time as a connection between independent height adjustable air supply line quick coupler component 404 and inter-section independent suspension height quick connect component 416. Independent height adjustable air supply line quick coupler component 404 and tractor-to-trailer air supply line quick connect coupler component 406 may be standard airline quick connect or proprietary quick connects, if desired.

Independent height adjustable air supply line 402 provides air to feeder air supply reservoir 420, which provides air to the brake system (if desired) and to feeder suspension height valve 424, which adds or exhausts air to the feeder suspension air bag 428 via feeder section, independent to common suspension control valve 422. Coupler 414, and inter-section common suspension height quick connect component 440, provide air to common supply line 412, which provides air to feeder section independent to common suspension control valve 422 to shuttle feeder section independent to common suspension control valve 422 and overrides feeder suspension height valve 424 and provides pressure to feeder suspension air bag 428, resulting in a common pressure in all air bags. Feeder suspension height valve 424 could be an industry standard height control valve or any suitable substitute. Feeder section independent to common suspension control valve 422 could be a pilot valve, manual valve or any suitable substitute, which diverts or directs air pressure either from valve 424 (for independent travel) or from common supply line 412. Feeder suspension height valve 424 is coupled to feeder section independent to common suspension control valve 422 and via feeder suspension linkage 430 and suspension arm 431.

On the right side of FIG. 4, there is shown a tractor-to-trailer air supply line quick connect component 454 coupled to a crusher section main air supply quick connect component 452 and via crusher section main air supply line 450 to crusher section air supply reservoir 456, which provides air to the brake system (not shown) and to crusher section suspension height valve 460, which is coupled to a suspension arm 431 by suspension linkage 466.

Crusher section suspension height valve 460 is coupled via crusher section suspension supply line 462 to the various crusher section suspension air bags 464 and also to manual shut-off 446 and via inter-section common suspension height supply line 442 to inter-section common suspension height quick connect component 440, which couples it to feeder section independent to common suspension control valve 422, as discussed above, to provide for common suspension height control when material feed section 110 and rock crusher section 130 are combined. The air suspension system of the present invention can be designed so that only one axle is monitored for height control and the other axles are only pressure controlled. The primary purpose would be focused on an equalized axle load, not equal height control. The actual lengths of the air bags would vary due to frame deflection, frame slope, or ground level.

Crusher section main air supply line 450 is coupled via crusher section independent suspension height supply line 458 to inter-section independent suspension height manual shut-off 444, which is coupled to inter-section independent suspension height quick connect component 416.

The material feed section 110 and rock crusher section 130 can be used and then separated using the following process:

1. Towing tractor is attached to front of combined chassis; i.e., to front of rock crusher section 130 and airlines are attached at crusher section main air supply quick connect component 452.

2. Air system, including both feeder air supply reservoir 420 and crusher section air supply reservoir 456, is charged from towing tractor.

3. Disconnect rear chassis suspension air lines, both independent height adjustable air supply line 402 and common supply line 412 and electrical lines; this thereby locks the rear axle and applies the brakes.

4. Disconnect mechanical latch of some type to enable relative movement between the chassis.

5. Tow rock crusher section 130 chassis forward, sliding under material feed section 110 chassis until contact with a slide stop.

6. Start material feeder section gas-powered hydraulic pump 310 and unfold material feeder trailer jack 210 to vertical position.

7. Extend material feeder trailer jack 210 to lift material feed section 110 chassis above slide stop.

8. Tow rock crusher section 130 chassis away from material feed section 110 chassis.

9. Back the feeder tow tractor into position under material feed section 110 chassis.

10. Use material feeder trailer jack 210 to adjust height to allow engagement with towing tractor.

11. Continue backing tractor into material feed section 110 chassis until king pin locks engagement.

12. Hydraulically retract and fold material feeder trailer jack 210 and turn off material feeder section gas-powered hydraulic pump 310.

13. Attach air and electric lines to towing tractor.

14. Turn manual rear axle brake valve to "off" position. (In some embodiments, this step may be omitted.)

In an alternate embodiment, to separate the feeder from the crusher, leaving the crusher in place, you could repeat steps 1 through 3, then release the brakes in axle 114 while retaining pressure in the air bag 428, then release the mechanical latch, thereby allowing relative movement aided by a hydraulic or winch-type system to move chassis 110 backwards to the mechanical stop.

Also, rollers could be used to further facilitate relative movement of the two chassis.

The terms "road building materials" are used throughout this description as an example of a common use of aggregate materials. It should be understood that the terms "road building materials" are intended to include aggregate materials, irrespective of the actual use to which such aggregate materials may be put. Similarly, the terms "rock crusher" are used as a common example of the use of a crusher; however, the terms "rock crusher" are intended to include any crusher, whether it is rock, concrete, or any other material that is being crushed.

It will be understood that certain features and sub-combinations are of utility and may be employed without reference to other features and sub-combinations. This is contemplated by and is within the scope of the claims.

Figure 6:
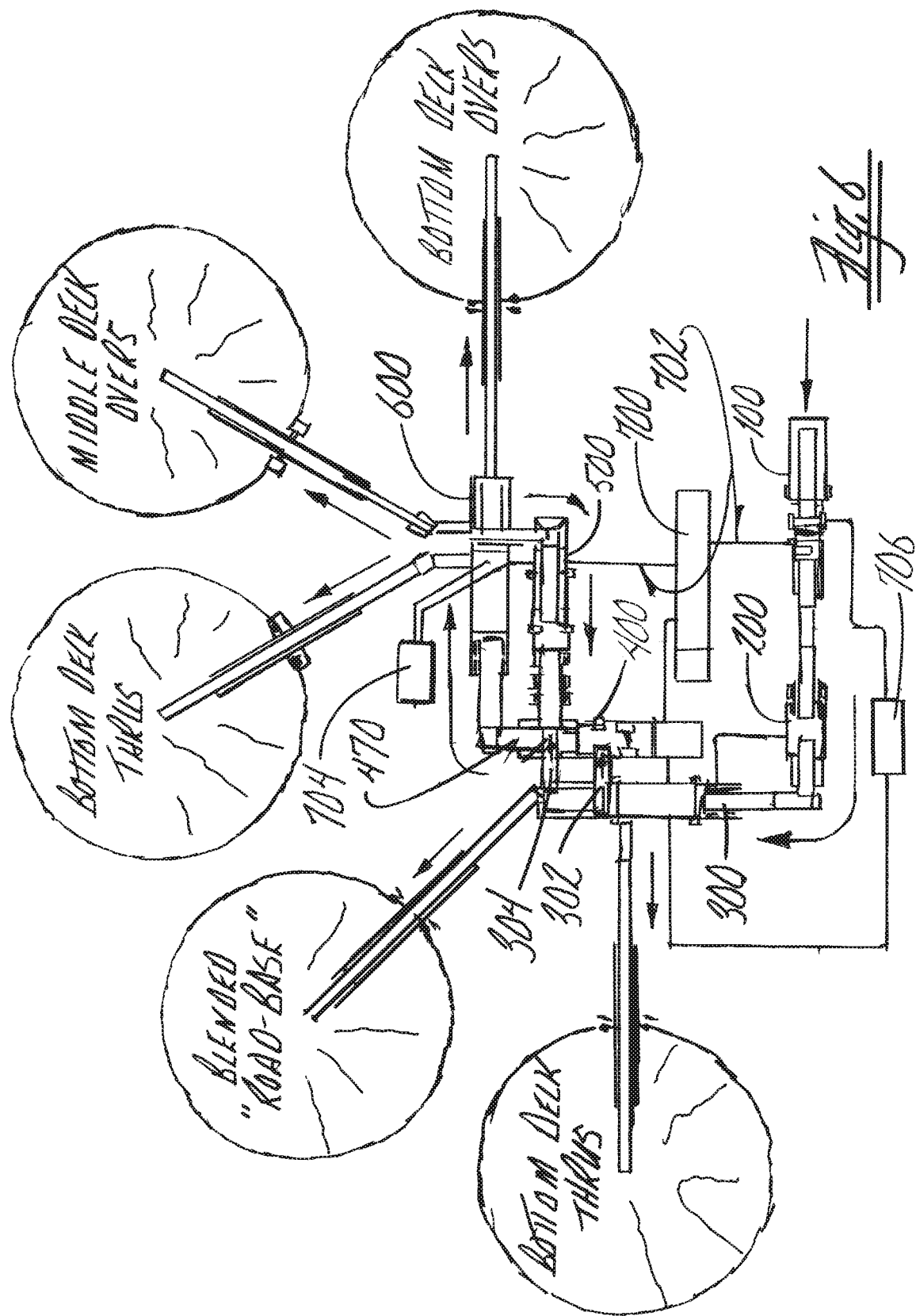
FIG. 6 is a plant view of the system of the present invention disposed interior of an array of stockpiles. The plant shown is a "regular plant" embodiment of the system of the present invention which shows more components and a somewhat larger footprint than the mini plant.
Figure 7:
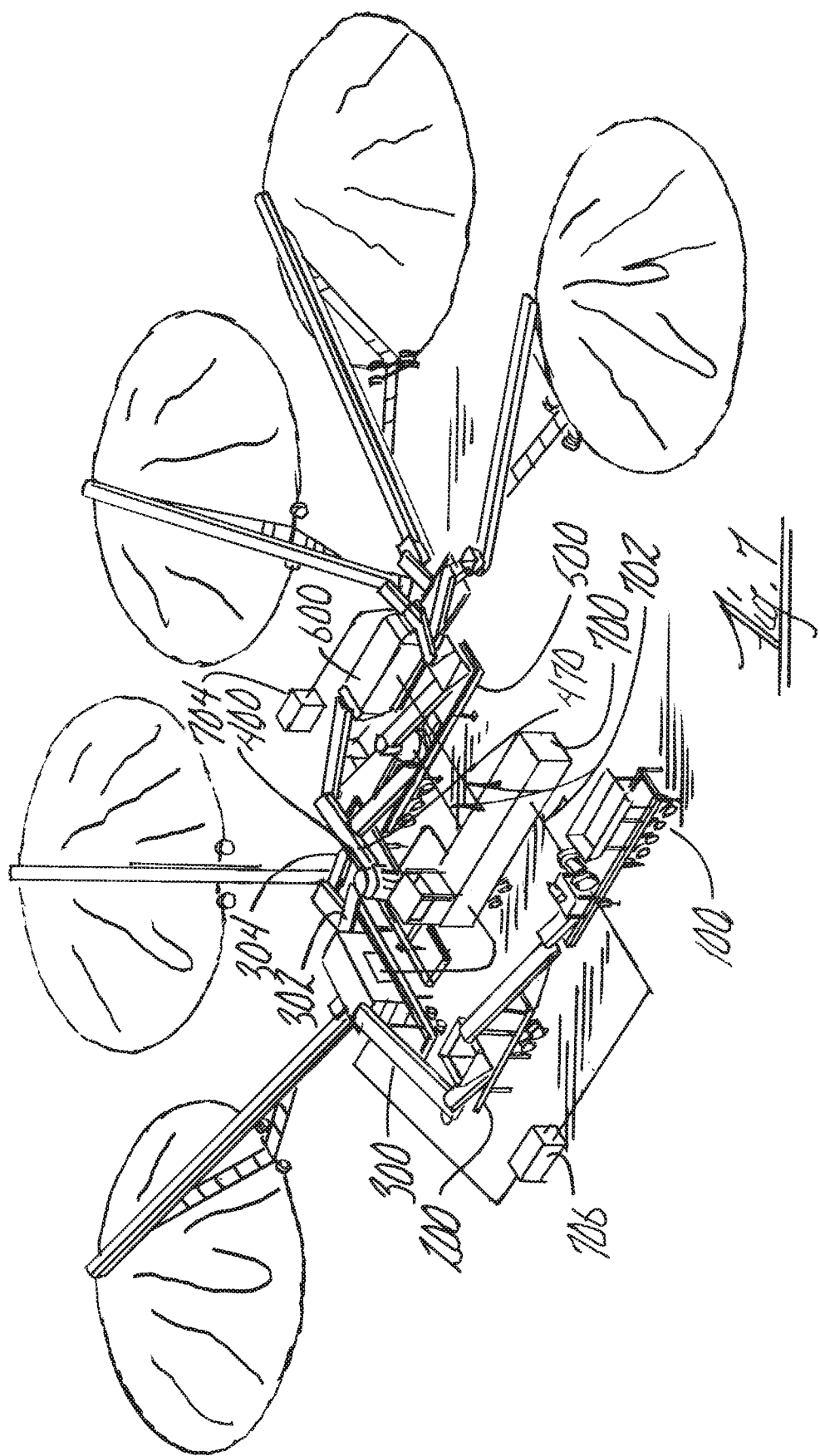
FIG. 7 is a perspective view of the system of FIG. 6.

Now referring to FIGS. 6 and 7, there is shown an array of product piles and a system for processing road building materials. There is shown a bifurcatable crusher 100, a surge bin material transfer apparatus 200, and scalping screen 300 and a scalping screen to secondary cone input conveyor 302 and a secondary cone bypass conveyor 304, which delivers the output of scalping screen 300 to the output of secondary cone crusher 400 without running the material through secondary cone crusher 400.

Bifurcatable crusher 100 can be a jaw crusher, such as those manufactured by Cedarapids Inc., or other type which has a significant weight which would exceed a maximum weight for a trailer to travel as one complete unit.

Scalping screen 300 may have various sized screens therein, but in one embodiment, it might have screens of the following sizes: 2.5 inches top deck, 1.25 inches middle deck, and a 0.875 inches bottom deck, all being 6'×20'. Scalping screen 300 is shown outputting two (2) stockpiles, with a total of five (5) stockpiles for the entire system, but it should be understood that one embodiment of the present invention is capable of simultaneously outputting seven stockpiles, five of which could be blended (material which is known to be separated to different size ranges and then later combined). More details of the design and operation of scalping screen 300 will be understood when referring to FIG. 10 below.

Secondary cone crusher 400 has one output conveyor, secondary cone output conveyor 470, which accepts material from three sources, the output of the secondary cone crusher 400, the secondary cone bypass conveyor 304 (at a common height), and the output conveyor of the tertiary cone crusher 500 (at a common height). In one embodiment, secondary cone crusher 400 could be an MVP-type cone crusher, as manufactured by Cedarapids, Inc., with a one-inch output setting. Secondary cone output conveyor 470 feeds finish screen 600 (at a common height) which has four (4) output conveyors, three (3) of which deliver material to stockpiles and another which loops material back around via tertiary cone crusher 500 to secondary cone output conveyor 470 (at a common height) and then back through finish screen 600.

Tertiary cone crusher 500 could also be an MVP-type cone crusher and, in one embodiment, could have a ½-inch output setting. Tertiary cone crusher 500 also has a common feed point height that is set to cooperate with the common output conveyor height of the scalping screen 300 and finish screen 600.

Finish screen 600 could, in one embodiment, be a triple deck screen with a 0.75-inch top deck, a 0.5-inch middle deck, and a 0.25-inch bottom deck, all of which could, in one embodiment, be an 8'×20' screen.

Figure 5:
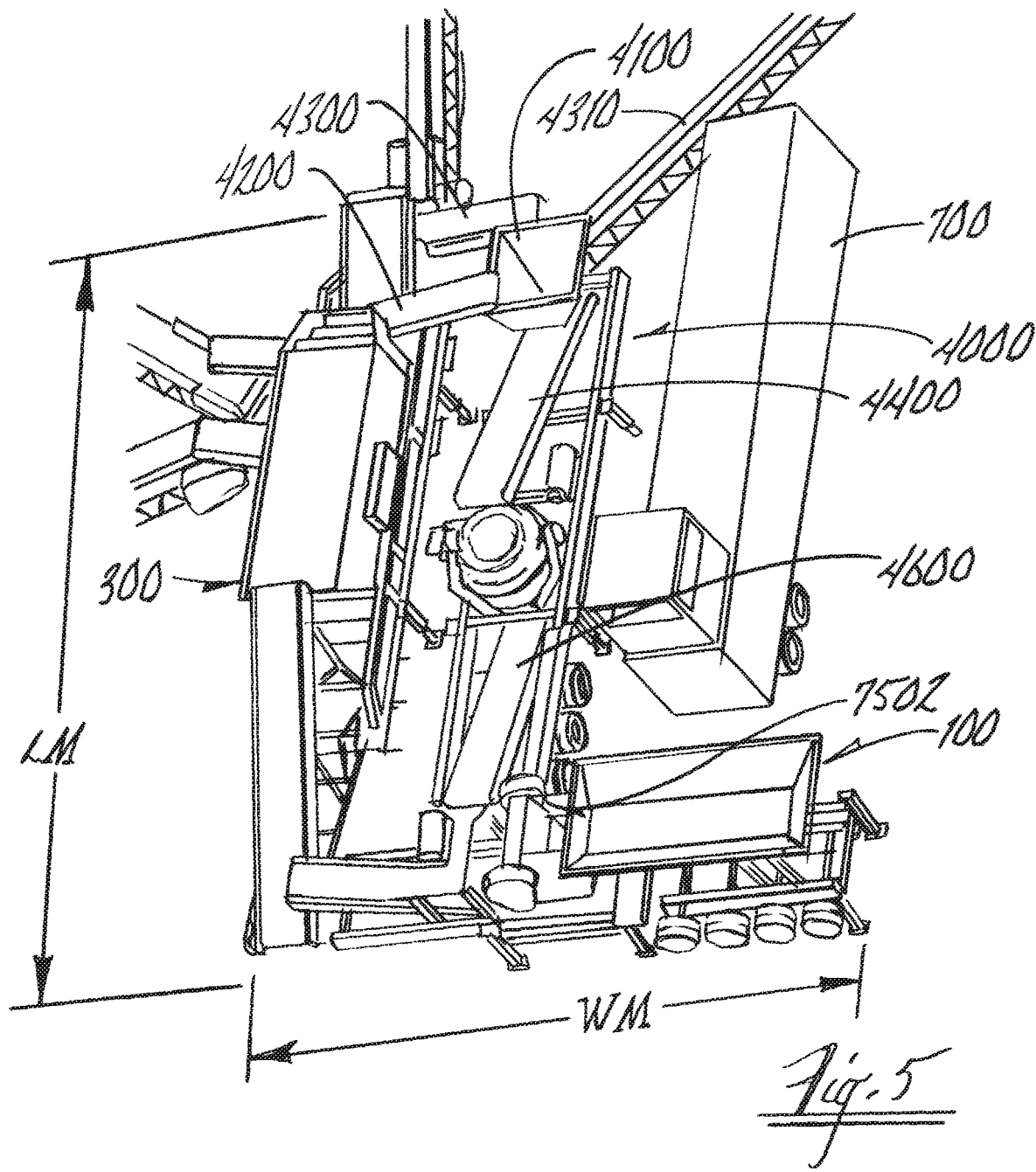
FIG. 5 is an overhead perspective view of a "mini plant" embodiment of the system of the present invention, which shows fewer components and a smaller footprint.

With the common output conveyor heights and the common feed point heights of the various components to the system, it is possible to customize a solution for a particular specification or application. For example, the mini plant of FIG. 5 is enabled because of the common output and feed point heights across the various components. Control trailer 700 is the central control and power source for the various components. In one embodiment, the control trailer 700 may provide only control signals leaving the power supplying function to the generators 704 and 706. In another arrangement, control trailer 700 could provide both. In still other embodiments, control trailer 700 could provide power, as well as additional generators 704 and 706. Power supply and control wires 702 would connect the control trailer 700 with the various components. Having a small footprint for the system allows for short power supply lines between the control trailer 700 and the various other components. The shorter the power supply lines, the less resistance and the concomitant energy loss associated therewith. With less energy loss, a smaller generator can be used, thereby conserving fuel costs. Also, with shorter power supply lines, which are typically much larger than the lines that merely provide control signals, you get less weight and easier and quicker setup times. Alternatively, each component could have its own engine/generator system and could be connected together via a wired or wireless network.

It should be noted that the system of FIGS. 6 and 7 does not have any stand-alone single purpose inter-plant conveyor trailers; i.e., each conveyor in the system of the present invention is coupled to and combined with and transported as part of a function piece of equipment, which provides a function other than merely conveying material. The surge bin material transfer apparatus 200 provides the function of buffering irregular flows by temporarily storing material exiting the bifurcatable crusher 100 at times of high output flow. Additionally, in one embodiment, all of the inter-plant (between screen, crusher, and surge bin) conveyors used in the entire system are not configured to provide substantial vertical height adjustment of the discharge point. The use of such common discharge point heights from the various inter-plant conveyors enables faster setup times while preserving the ability to move the screens and crushers around to form different system configurations. One of the innovative methods of the present invention is to rearrange, add to, or omit from a first system, screens, crushers and surge bins, and thereby create a different combination without making any horizontal or vertical adjustments of the any discharge points of any inter-plant conveyors. The use of common discharge and common feed points for the various screens, crusher and surge bins allows for this to occur.

The various screens, crushers, etc. are shown with wheels and tires thereon for providing the ability to transport them on a highway. However, it should also be understood that some embodiments of the present invention might include tracks instead of tires or in addition to tires. Even if the system is designed with tracks, many of the beneficial aspects of the invention are still achieved.

Now referring to FIG. 5, there is shown an overhead perspective view of a "mini-plant" embodiment of the present invention, which has fewer major components and occupies a smaller footprint than the system as shown in FIGS. 6 and 7 and provides fewer stockpiling conveyors. In particular, there is shown a system comprising bifurcatable crusher 100, a scalping screen 300 and a secondary cone crusher 4000 and a control trailer 700. Screen plant exiting conveyor 4300 provides material to the stockpiling conveyor 4310. Numerous other stockpiling conveyors are fed by similar exiting conveyors. The scalping screen 300 has a returning output conveyor 4200, which provides an output with predetermined characteristics to the surge bin 4100, which feeds the cone crusher feed conveyor 4400, which delivers the material to the top opening of the cone crusher 4500, which then provides an output on conveyor 4600 to an output conveyor on bifurcatable crusher 100, which then delivers the material directly to an input onboard conveyor for the scalping screen 300, where the material is screened a second time and delivered to the appropriate stockpiles. With the mini-plant, it may be necessary to give extra care to the rate and nature of material entering the bifurcatable crusher 100, as there is no surge capacity as is provided by the surge bin material transfer apparatus 200 of FIGS. 6 and 7. The mini plant does have a further advantage in that the power supply lines from the control trailer 700 are shorter, thereby reducing energy loss related to electrical resistance, which increases with length of the power supply lines. The mini plant as shown in FIG. 5 could be operated without additional generators, where the only source of power is the control trailer 700. The lack of independent conveyor trailers deployed in between the crushers and screens and the necessary space to maneuver such trailers is noticeable, especially with respect to the mini plant. However, in some embodiments, it is desired to leave space between the trailers sufficient to allow small skid steer-type loaders to gain access to areas where cleanup is needed. The present invention, with all conveyors being disposed onboard a trailer containing structure to perform a function additional to merely transporting the material, provides the ability for this small footprint. Additionally, in one embodiment, all of the inter-plant (between screen, crusher, and surge bin) conveyors used in the entire system are not configured to provide substantial vertical height adjustment of the discharge point. A surge bin material transfer apparatus 200 (FIGS. 6 and 7) is understood to provide a buffering ability to accommodate substantial surges in output of a crusher or diminution in acceptance by a screen. Note that structure at the very end of a conveyor which helps to deflect material and provides only very minor buffering ability, such as the deflecting structure 1907 (FIG. 19), is considered herein and in the claims not to provide substantial buffering for surges. The multiple common feed point height and output conveyor heights allow for flexibility in configuring an aggregate processing system for a particular need.

Figure 8:
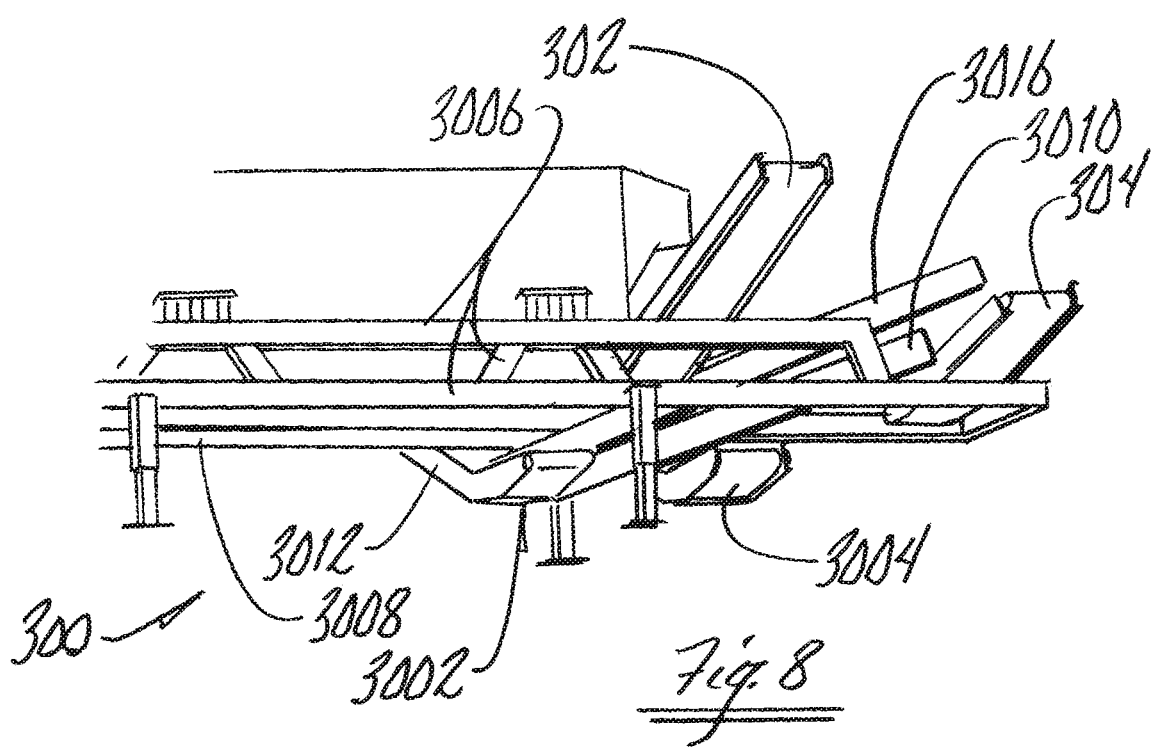
FIG. 8 is an upwardly looking perspective view of the output end of the scalping screen 300.
Figure 13:
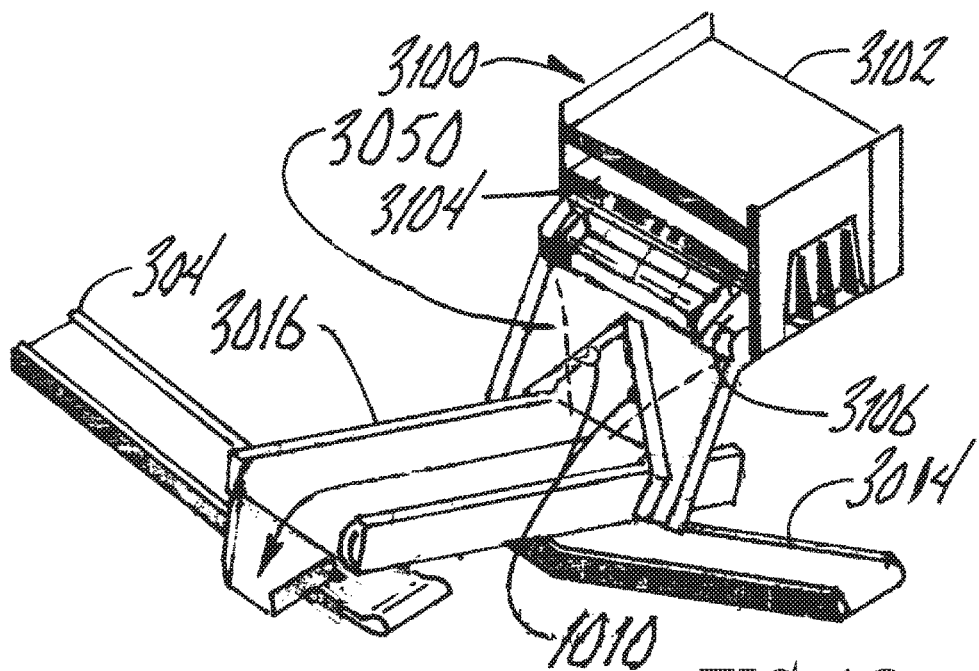
FIG. 13 is a perspective view of the portion of the scalping screen 300 of the present invention with components thereof removed to better reveal portions of the system which transport middle deck overs.

Now referring to FIG. 8, there is shown an upwardly looking perspective view of the scalping screen 300, which displays the multiple common conveyor output aspect of the present invention, which includes the scalping screen to secondary cone input conveyor 302 (at a first common height), secondary cone bypass conveyor 304 (at a second common height) and the first under conveyor tail 3002 coupled to the first under conveyor head 3012 (at a third common height). Also shown is the second under conveyor tail 3004, which coupled to a conveyor head 3014 (FIG. 13). Also shown is the scalping screen fines collection conveyor 3008, the scalping screen blending conveyor 3010, the scalping screen second blending conveyor 3016, and the scalping screen frame 3006.

Figure 9:
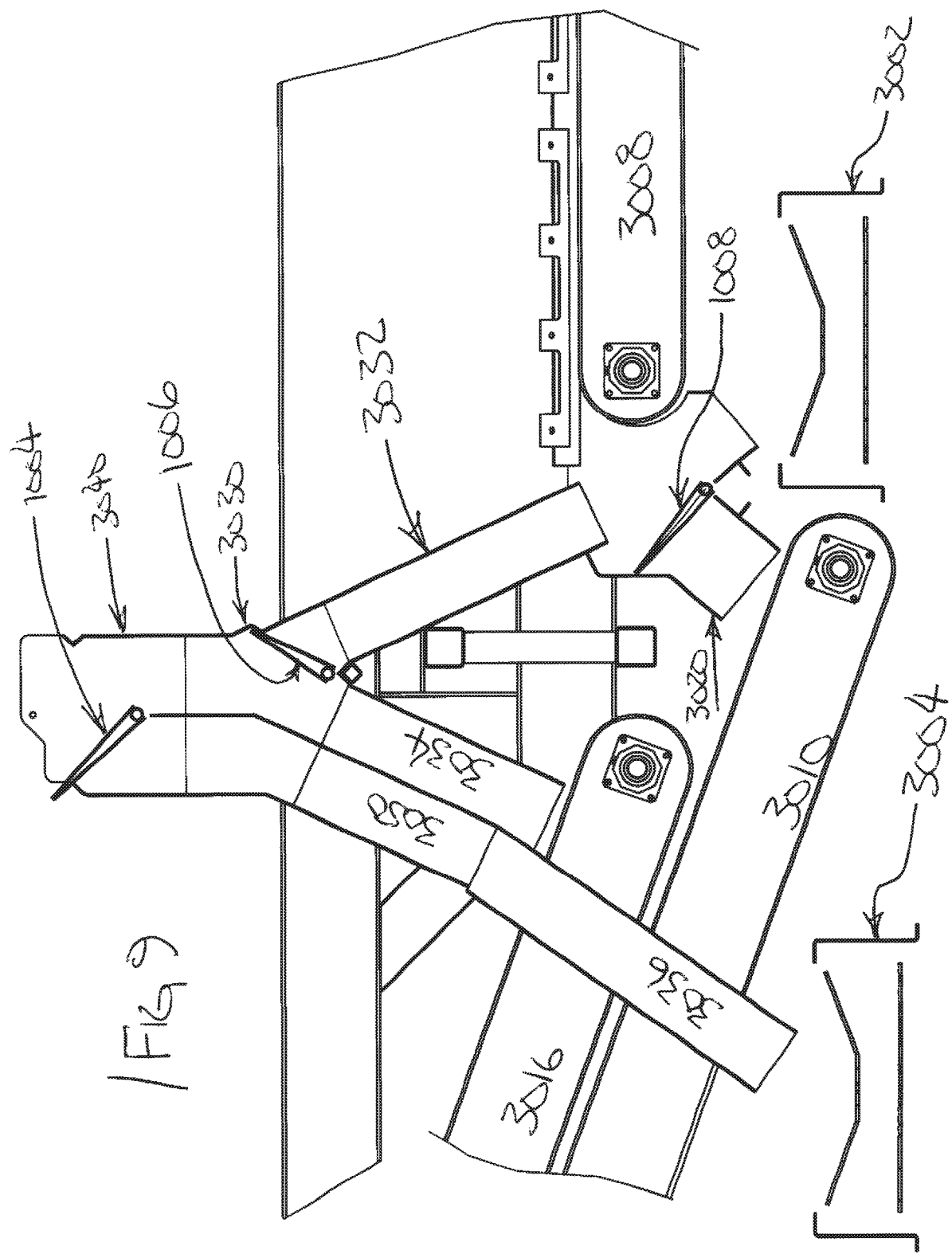
FIG. 9 is a close-up view of the blending area of the output end of the scalping screen 300.

Now referring to FIG. 9, there is shown a close-up view of the output and blending end of the scalping screen 300, which includes: first fines blending chute 3020 which contains gate assembly 1008 and accepts material from lower blending chute to fines blending chute transfer chute 3032 and scalping screen fines collection conveyor 3008 and delivers the same to scalping screen blending conveyor 3010 and/or to first under conveyor tail 3002. Lower blending chute to fines blending chute transfer chute 3032 accepts material from lower blending chute 3030, which contains gate assembly 1006 and variably provides material to lower blending chute to fines blending chute transfer chute 3032 and/or lower blending chute to blending conveyor transfer chute 3034. Lower blending chute to blending conveyor transport chute 3034 provides material to scalping screen second blending conveyor 3016. Upper blending chute 3040, which contains gate assembly 1004, variably provides material to lower blending chute 3030 and/or transverse blending chute 3050. Transverse blending chute 3050, which contains gate assembly 1010, variably provides material to scalping screen second blending conveyor 3016 and/or second under conveyor tail 3004, via pant-leg chute 3036. Note that pant-leg chute 3036 comprises two separate chutes that straddle scalping screen blending conveyor 3010 and scalping screen second blending conveyor 3016.

Figure 10:
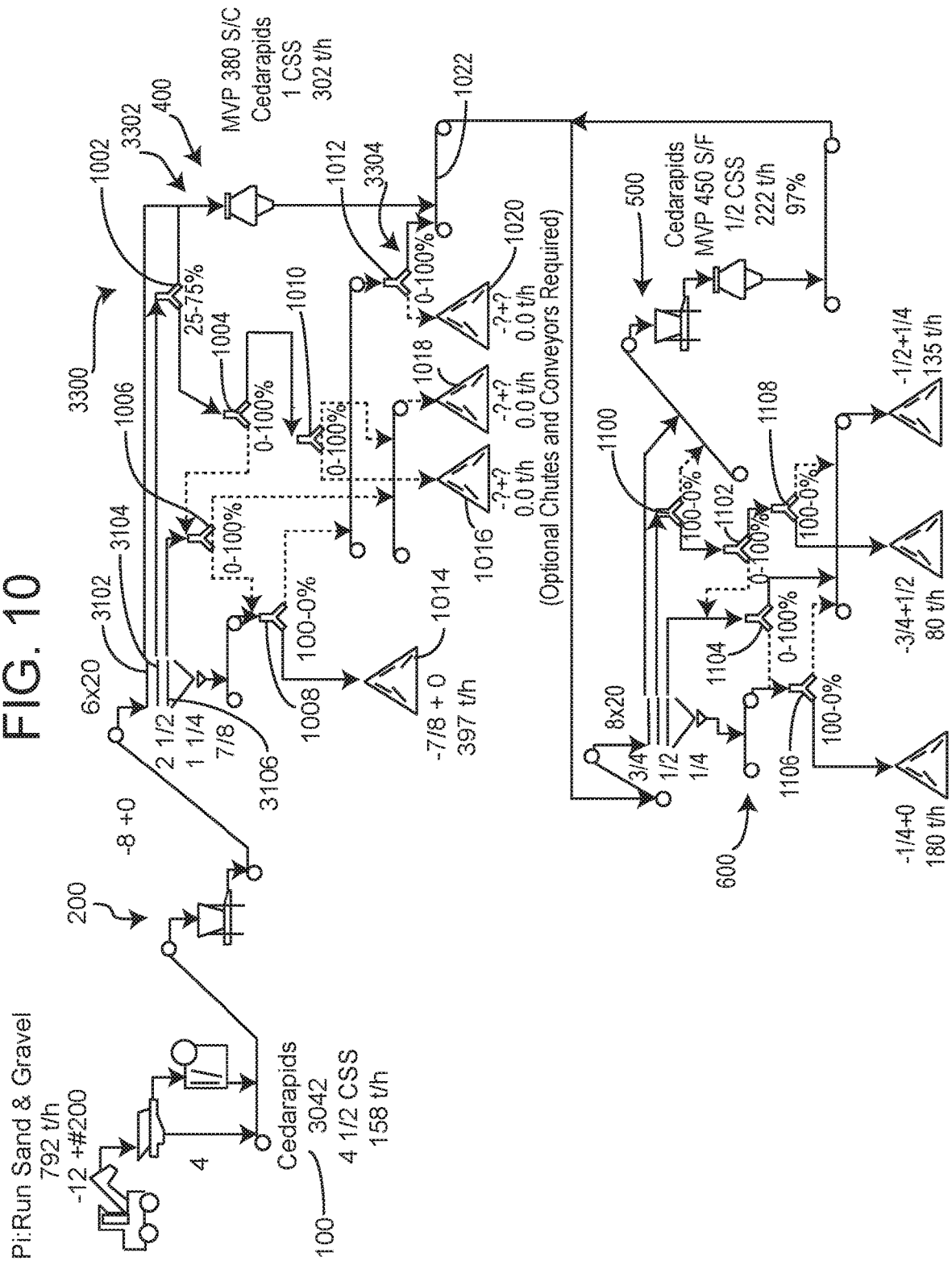
FIG. 10 is a schematic flow diagram graphically showing flows of material through the innovative system of the present invention. The dashed lines represent paths of material which did not flow in the representative evaluation.

Now referring to FIG. 10, there is shown a flow diagram of a representative process of the present invention. The material sizes and throughput rates in tons/hour (t/h) are not intended to be limiting, but to provide details of one embodiment of the present invention operated under one representative evaluation scenario. Note the dashed lines represent material paths that did not carry material in the selected evaluation scenario. The process begins with bifurcatable crusher 100 crushing material to be processed, then surge bin material transfer apparatus 200 transports the material to the scalping screen 3300, where it is graphically depicted as having three (3) stacked screens, top deck 3102, mid deck 3104 and lower deck 3106. Note that scalping screen 3300 is similar to scalping screen 300 of FIGS. 6, 7, 8, and 9 with one significant difference being the number of sliding swing gate blending assemblies, that are included in scalping screen 3300, is more than the number in scalping screen 300, and the number of stockpiling conveyors could be different. It is believed that once the sliding swing gate blending assembly 1500 (FIGS. 15-18) is understood and the innovative instruction to substitute is made herein, then the substitution would be capable of being carried out by one having ordinary skill in the art. The overs of top deck 3102 are provided to scalping screen to secondary cone input conveyor 3302 (which is similar to conveyor 302) and then on to secondary cone crusher 400. The overs of mid deck 3104 are provided to gate assembly 1002, which could be an array of selectively pluggable holes or, like all of the other gates herein, be either a swing gate or a sliding swing gate or any suitable substitute, which can direct the material either to secondary cone crusher 400 or to the sliding swing gate blending assembly 1004, the output of which is directed either to sliding swing gate blending assembly 1010 or to sliding swing gate blending assembly 1006, where the overs of lower deck 3106 are also received. (Note: when the term "sliding swing gate blending assembly" is used, it is intended to include, but is not necessarily limited to, a gate which is capable of infinite, but not necessarily continuous variation in flow from 0-100%.)

The output of sliding swing gate blending assembly 1006 is directed to either stockpile 1018 or to sliding swing gate blending assembly 1008, which can send the material to either stockpile 1014 or to sliding swing gate blending assembly 1012, which feeds either stockpile 1020 or secondary cone bypass conveyor 3304 to conveyor 1022, which provides material to finish screen 600 and tertiary cone crusher 500. Conveyor 1022 of FIG. 10 represents the very same conveyor secondary cone output conveyor 470.

One noteworthy feature of the scalping screen 3300 is that, in one embodiment, there is a stacked series of four gravity-fed diverters for variably directing the middle deck overs. Material which passes through the top deck, but not through the middle deck, encounters gate assembly 1002, then sliding swing gate blending assembly 1004, then on to sliding swing gate blending assembly 1006, after which it is blended with the bottom deck throughs, then on to sliding swing gate blending assembly 1008. The material then goes on with the aid of an intermediate conveyor finally to yet another, the fifth diverter onboard scalping screen 3300, sliding swing gate blending assembly 1012.

The output of sliding swing gate blending assembly 1010 is to either stockpile 1016 or 1018.

The output of secondary cone crusher 400 and secondary cone bypass conveyor 3304, which is similar to secondary cone bypass conveyor 304, is combined to conveyor 1022 and then provided to finish screen 600, which is also a three-deck screen, similar in style to scalping screens 3300 and 300, but with finer screens for more precise discrimination of materials, and it may have different discharge chutes and conveyors. The overs of finish screen top deck, which could be a ¾-inch screen, go to tertiary cone crusher 500. The overs of the mid deck, which could be a ½-inch screen, go to sliding swing gate blending assembly 1100 (which could be similar to gate assembly 1002), which provides material to either sliding swing gate blending assembly 1102 (which could be similar to gate assembly 1004) or to tertiary cone crusher 500. Sliding swing gate blending assembly 1102 provides material to either sliding swing gate blending assembly 1104 (which could be similar to gate assembly 1006) or sliding swing gate blending assembly 1108 (which could be similar to gate assembly 1010). All gate assemblies herein could variably divert material to one location and/or another location.

The overs of the lower deck, which could be a ¼-inch screen, go to sliding swing gate blending assembly 1104, which directs such material to either sliding swing gate blending assembly 1106 (which could be similar to gate assembly 1008) or a stockpile.

The fines of finish screen 600 can go to sliding swing gate blending assembly 1106, which can go to a fine stockpile or be blended with other material and delivered to a stockpile. The output of tertiary cone crusher 500 is returned to finish screen 600, where it is processed again and directed eventually to the appropriate stockpile.

The present invention provides a level of blending control, which has been very difficult to achieve in a mobile aggregate crushing system. Often road builders will give a specification for base aggregate of having a maximum percentage of fines less than X inches. Often operators of rock crushers and aggregate processing systems would attempt to minimize the fines in the delivered road blend product. This minimization of the fines results in a higher level of less desirable rock. With this level of control, it provides the plant operator with the ability to include a controlled amount of fines (just under the limit of the road blend specification) instead of building a larger stockpile of waste rock. This notion of transforming otherwise waste rock into usable material results in increased profits for the plant.

Figure 11:
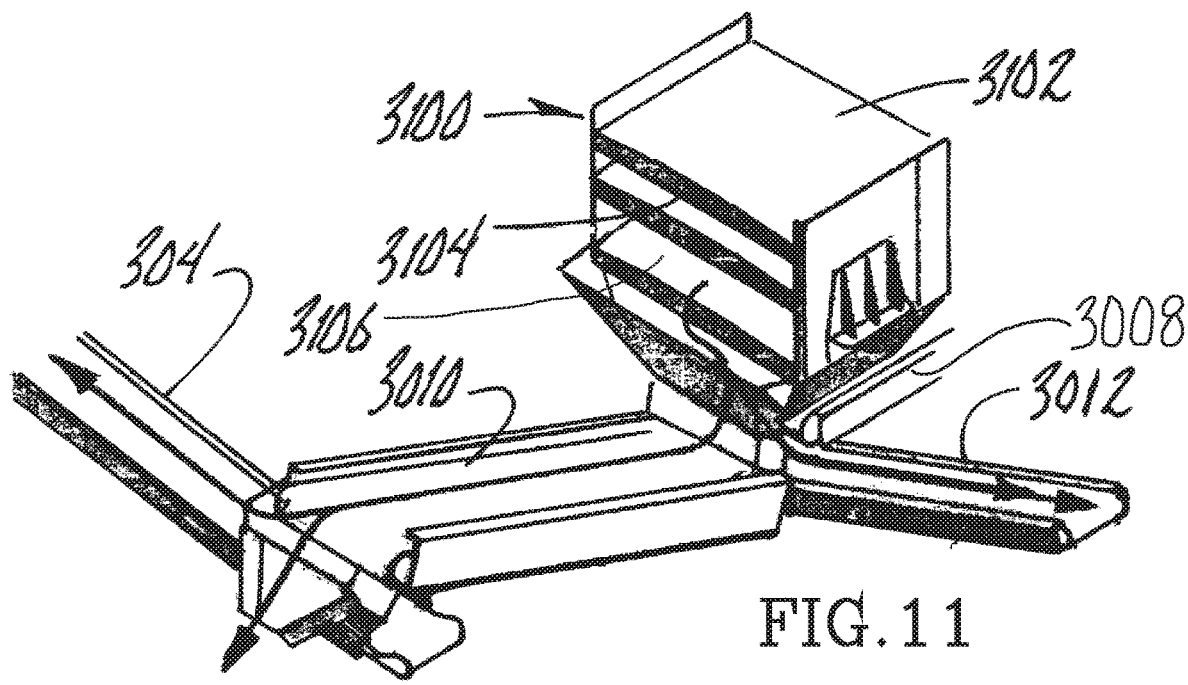
FIG. 11 is a perspective view of the portion of the scalping screen 300 of the present invention with components thereof removed to better reveal portions of the system which transport bottom deck overs.
Figure 12:
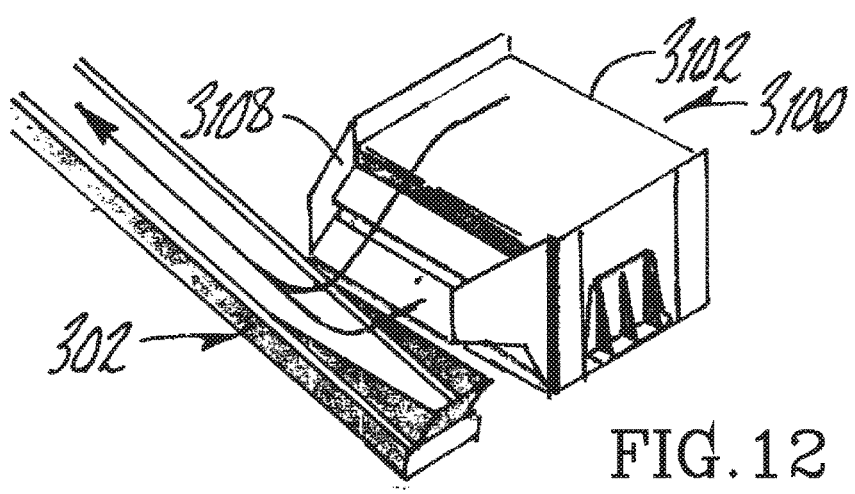
FIG. 12 is a perspective view of the portion of the scalping screen 300 of the present invention with components thereof removed to better reveal portions of the system which transport top and optionally middle deck overs.

Now referring to FIGS. 11 and 12, there are shown perspective views of a portion of the scalping screen 300, which includes the top deck 3102, mid deck 3104, lower deck 3106 and the discharge lip 3108, which collectively are called the triple deck screen 3100.

Also shown is the scalping screen blending conveyor 3010, first under conveyor head 3012 and the secondary cone bypass conveyor 304. Also shown is scalping screen to secondary cone input conveyor 302.

Figure 14:
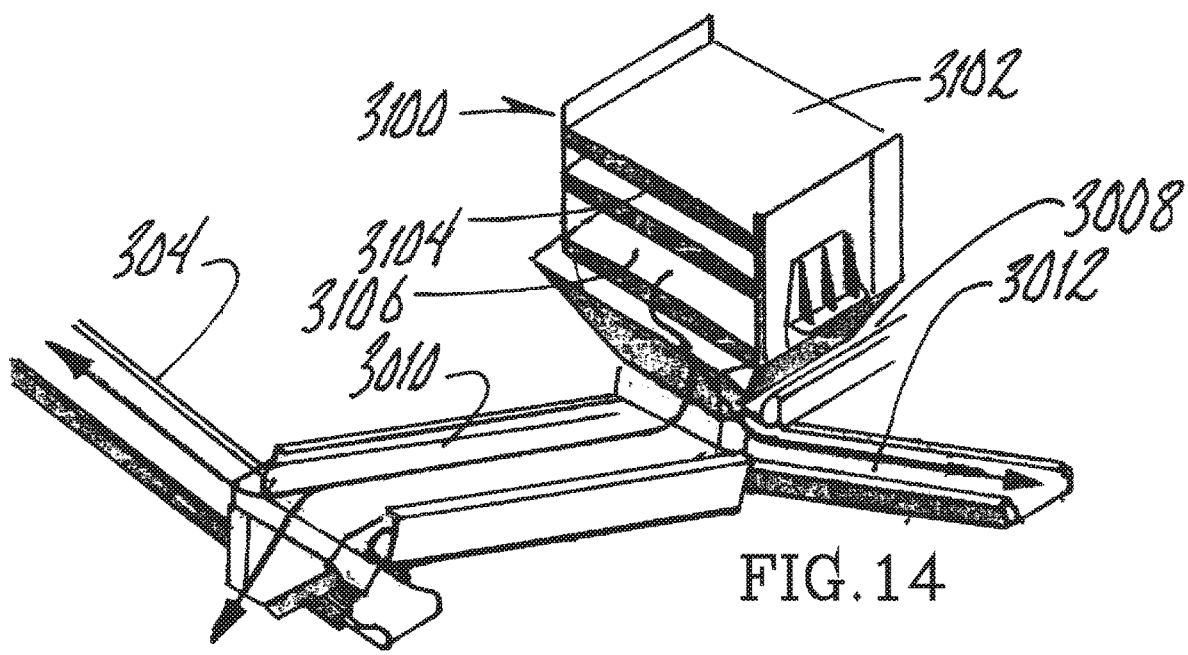
FIG. 14 is a perspective view of the portion of the scalping screen 300 of the present invention with components thereof removed to better reveal portions of the system which transport bottom deck throughs or fines.
Figure 17:
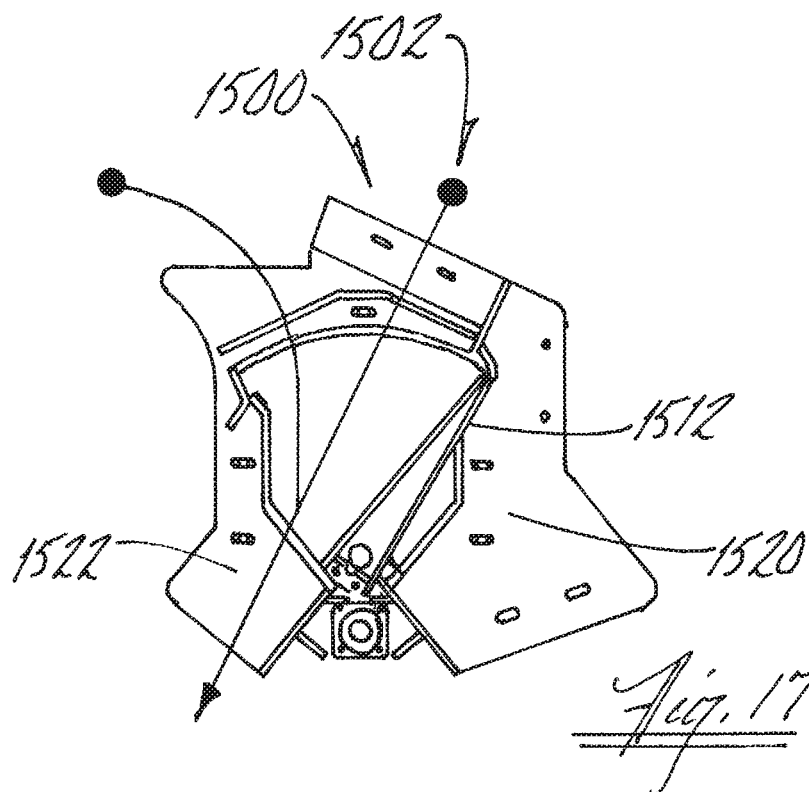
FIG. 17 is a cross-sectional view of the sliding swing gate blending assembly of FIGS. 15 and 16 taken on a central line when the swing gate is in a backward flow direction position. The lines with arrowheads and opposing bulbous ends thereon show flow directions of material through the sliding swing gate blending assembly 1500.
Figure 18:
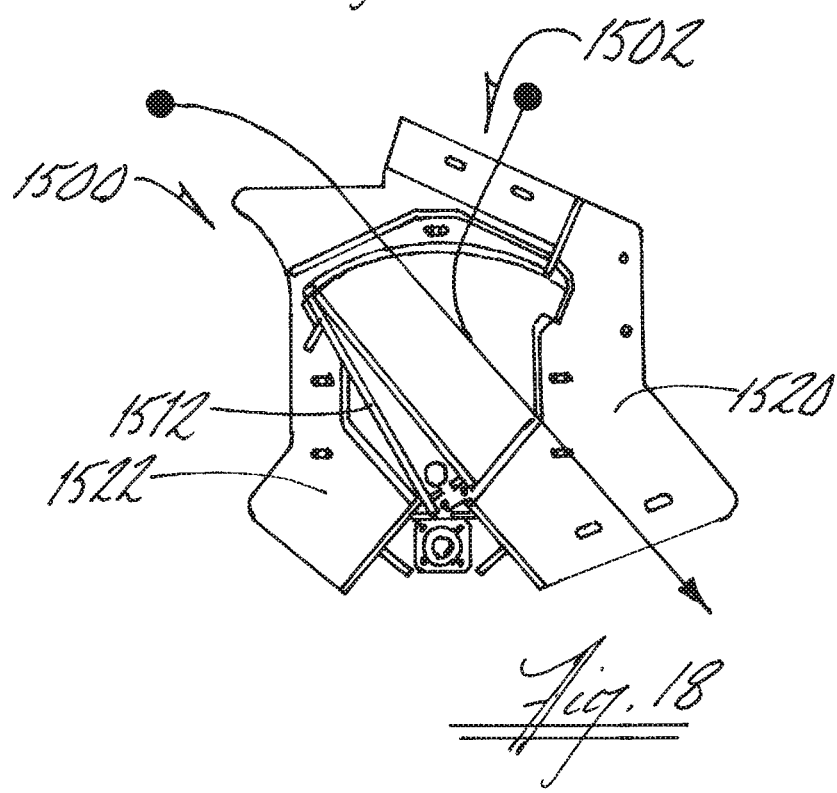
FIG. 18 is a cross-sectional view of the sliding swing gate blending assembly of FIGS. 15 and 16 taken on a central line when the swing gate is in a forward flow direction position. The heavy black lines with heavy black arrowheads and opposing heavy black bulbous ends thereon show flow directions of material through the sliding swing gate blending assembly 1500.

Now referring to FIGS. 13 and 14, there are shown perspective views of a portion of scalping screen 300 removed to reveal underlying important structure which otherwise would be occluded from view. Shown is transverse chute assembly 3050, which contains gate assembly 1010. Material from chute assembly 3050 can variably discharge to scalping screen second blending conveyor 3016 and/or second under conveyor tail 3004 (FIG. 8) and second under conveyor head 3014.

Some of the beneficial aspects of the present invention are provided by the novel features of the sliding swing gate blending assembly 1500 shown in FIGS. 15-18.

In general, each of the sliding swing gate blending assemblies 1500, located at various points in the scalping screen 300, have a fixed material entry top chute 1502 and a fixed backward flow exit chute 1522 and a fixed forward flow exit chute 1520. Disposed therebetween are the movable parts; i.e., the sliding and swinging portions of the sliding swing gate blending assembly 1500.

Referring in detail now to FIG. 15, there is shown a sliding swing gate blending assembly 1500 of the present invention, shown from a top view with the chute located thereabove removed to provide for easier visualization of the sliding swing gate blending assembly 1500. Also removed are covers which form in part the backward flow exit chute 1522 and forward flow exit chute 1520. The top or entrance chute, which provides material to sliding swing gate blending assembly 1500, would extend upwardly; i.e., toward the viewer and perpendicular to the plane of FIG. 15. Sliding swing gate blending assembly 1500 includes a sliding fixed backflow directing plate 1506 which, if exposed or partially exposed to the material entering through material entry top chute 1502, will always direct material in a backward direction. Also shown is sliding fixed forward flow directing plate 1510 which, if exposed or partially exposed to the material entering through material entry top chute 1502, will always direct material in a forward direction. Disposed between sliding fixed forward flow directing plate 1510 and sliding fixed backflow directing plate 1506 is sliding swing gate 1512, which can be pivoted or swung in one direction or the other to selectively direct material in either the forward or backward direction. Sliding swing gate 1512 is shown in FIG. 15 pivoted in a forward direction, which mimics the positioning of sliding fixed backflow directing plate 1506 and, therefore, results in material exiting through backward flow exit chute 1522.

Sliding fixed backflow directing plate 1506, sliding swing gate 1512 and sliding fixed forward flow directing plate 1510 may be coupled in a linear fashion, so that they can all be forced to slide or translate back and forth as a single unit. Sliding swing gate 1512 is always located fully within the material contacting portion sliding swing gate blending assembly 1500, and the sliding fixed backflow directing plate 1506 and sliding fixed forward flow directing plate 1510 may be located between 100% to 0% within the zone under material entry top chute 1502 which contacts the material.

As the sliding swing gate 1512 pivots from one position to the next, it is bounded on one side by the sliding swing gate backward side limit plate 1514 and on the opposing side by the sliding swing gate forward side limit plate 1516. When sliding swing gate 1512 is fully deployed to one position, the top end of sliding swing gate 1512 rests upon either the sliding swing gate rear rail 1530 or the opposing sliding swing gate front rail 1532, which together also provide for structural support in general of the sliding swing gate blending assembly 1500. Sliding swing gate 1512 is shown in FIG. 15 while in the process of pivoting between operating positions. The translational position of sliding swing gate 1512 is shown at approximately a 25 to 75 percent sharing setting. As sliding swing gate forward side limit plate 1516 moves closer, during the incremental adjustment process, to forward side end plate 1556, the sharing percentage between forward diversion and backward diversion will change and become more extreme; e.g., a ten percent to ninety percent sharing setting. Then as sliding swing gate forward side limit plate 1516 contacts endplate

1516, the sharing will be 0 to 100 percent. However, if the sliding swing gate 1512 were then pivoted, it would become a 50-50 sharing.

In operation, the sliding swing gate blending assembly 1500 could function as follows:

Material is output from a source of material, either overs, fines or a previously blended combination of the same. The material goes through a material entry top chute 1502 and drops upon the sliding swing gate blending assembly 1500. Depending upon the positioning under the material entry top chute 1502 of the slide assembly (which comprises sliding fixed backflow inclined directing plate 1506, sliding fixed forward flow inclined directing plate 1510 and sliding swing gate 1512), the material will flow in some set percentage to either the forward flow exit chute 1520 or the backward flow exit chute 1522. If a different mix of percentages is desired, then the slide assembly of sliding fixed backflow directing plate 1506, sliding swing gate 1512 and sliding fixed forward flow directing plate 1510, can be slid one way or the other to make an infinitely variable diversion of material through the sliding swing gate blending assembly 1500. While the sliding swing gate blending assembly 1500 is capable of infinite variability, it should be understood that the variations are not necessarily continuous. To go from a mixture with 47% forward, then to 49% forward, and finally to a mixture of 51% going forward, requires more than a continuation of the movement which resulted in an increase from 47% to 49%. The process would involve both flipping the sliding swing gate 1512 and sliding the same gate nearly completely to one side of the space under material entry top chute 1502; i.e., either minimizing or maximizing the gap between sliding swing gate forward side limit plate 1516 and end plate 1556.

It is believed that the combination of a sliding and swing gate provide for the ability to have a fully adjustable flow while reducing the vertical height of the apparatus to selectively divert flow. The small vertical height of sliding swing gate blending assembly 1500 allows for the more sliding swing gate blending assemblies 1500 to be stacked within the area below the output of the various screens of scalping screen 300. Therefore, this novel component provides for increased compactness of the scalping screen 300 with a high degree of blending controls.

Now referring to FIGS. 19-23, there is shown a side view of a folding conveyor 1900 of the present invention, together with a hopper/material intake location 1902, disposed in a position to receive material from the folding conveyor 1900. Hopper/material intake location is simply shown as an arrow to suggest the orientation of a side of the hopper and the flow direction of material in the hopper, etc. It should be understood that much more structure would be associated with such a hopper, and the arrow is merely intended to indicate the intake location or a side of the hopper.

Folding conveyor 1900 has a folding conveyor discharge end 1904 and a folding conveyor intake end 1906, and is divided into two sections which are movable with respect to each other, folding conveyor discharge section 1910 and folding conveyor intake section 1912, which are joined by folding conveyor section hinge 1914. Folding conveyor 1900 could be mounted to a material intake of scalping screen 300, an intake of the surge bin material transfer apparatus 200 or a stand-alone dedicated trailer, or it could be mounted to a trailer also carrying additional or other functional components. A folding conveyor central cam/arch 1920 is pivotally (capable of being pivoted) coupled at one point to a base, such as a trailer (not shown). Folding conveyor intake arm linkage 1922 is pivotally coupled at one end to folding conveyor central cam/arch 1920 and at an opposing end to folding conveyor intake end 1906. Folding conveyor midrange arm linkage 1924 is pivotally coupled at one end to folding conveyor central cam/arch 1920 and at an opposing end to an intermediate position of folding conveyor discharge section 1910. Folding conveyor intermediate arm linkage 1926 is pivotally coupled at one end to folding conveyor central cam/arch 1920 and at an opposing end to folding conveyor cam/drive head 1928.

Folding conveyor intermediate cam/drive head 1928 is pivotally attached to link 1926 and also pivotally attached to head support 1930 and hydraulic cylinder to intermediate cam connecting linkage 1936. The attachment to folding conveyor intermediate arm linkage 1926 and hydraulic cylinder to intermediate cam connecting linkage 1936 are at the same point. Linkage arm 1932 is pivotally coupled to connecting linkage 1936 at pin 1992. Hydraulic cylinder 1934 attaches to an ear on linkage arm 1932.

In operation, the folding conveyor is caused to retract from the hopper/material intake location 1902, as would happen when a job is finished and the folding conveyor 1900 is being readied for transport. The simple automated operation of the folding conveyor 1900 results in a reduced overall height and length, as well as increased separation from the hopper/material intake location 1902. The points of attachment to the trailer (not shown) are the free ends of hydraulic cylinder 1934, folding conveyor cam/drive head 1928, hydraulic cylinder distal end to vehicle linkage arm 1932 and folding conveyor central cam/arch 1920 (adjacent to the point where hydraulic cylinder 1934 is coupled to the trailer). It is possible that hydraulic cylinder 1934 is the only hydraulic cylinder, or other power assisting mechanism, used to successfully simultaneously retract, lower the overall height and shorten the overall length all with one sweeping motion initiated with a single actuation on the single control coupled to and controlling the hydraulic cylinder 1934. In one embodiment, the same linkage, etc. structure shown in FIG. 19 is disposed on the opposite side of the folding conveyor 1900 (see FIG. 24).

The folding conveyor central cam 1920, and said folding conveyor intermediate cam 1928, are configured so that when said hydraulic cylinder 1934 is extended, the folding conveyor discharge section 1904 first retracts away from, then drops below a receiving bin 1902 location, while the folding conveyor intake section 1907 moves first downward and inward, so that an overall height characteristic is less and an overall length characteristic is less than when said hydraulic cylinder 1934 is retracted.

Figure 19:
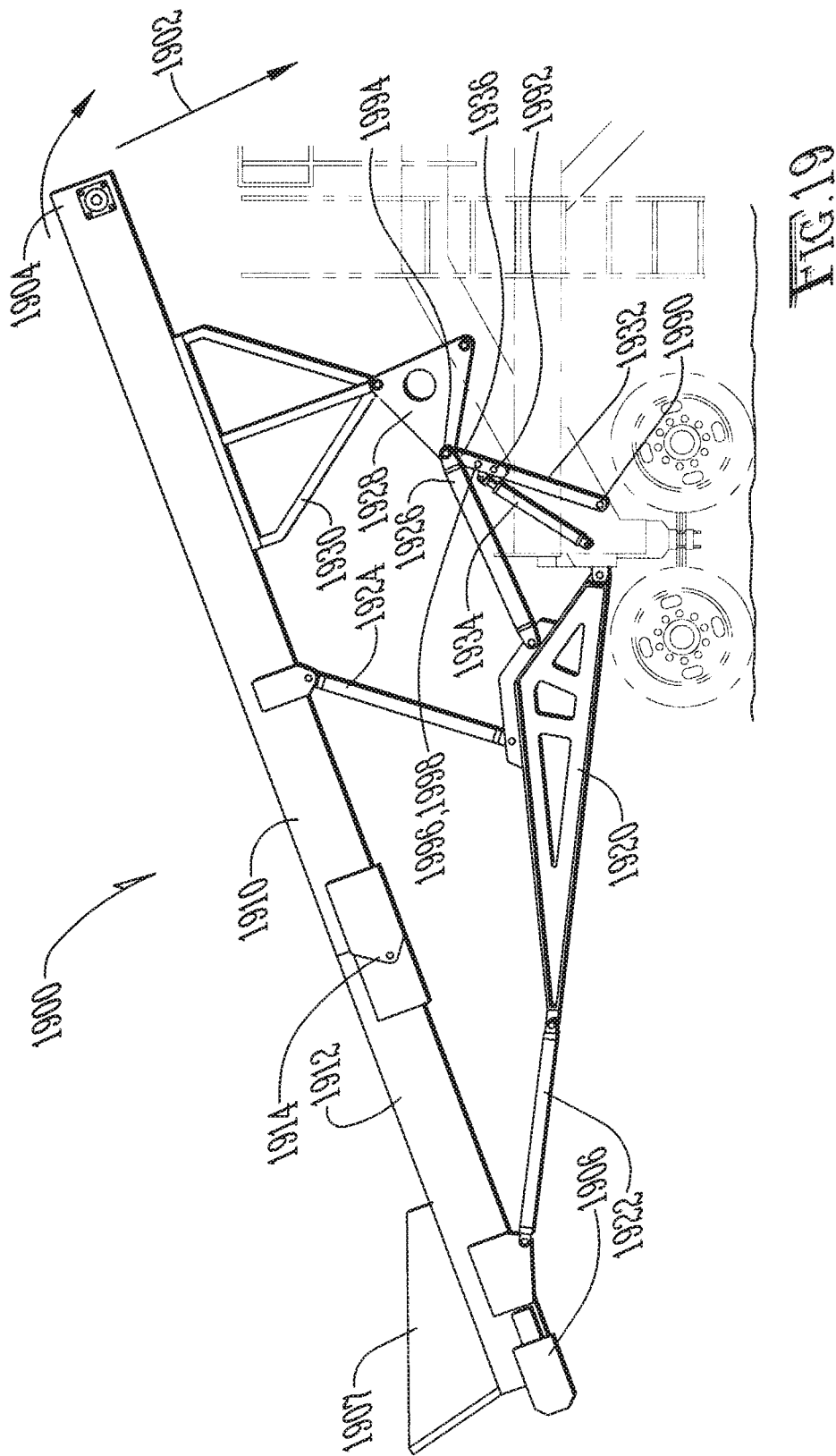
FIG. 19 is an elevation view of a folding conveyor of the present invention disposed next to a hopper or other structure for receiving material therein. The folding conveyor is shown in an operating position.
Figure 20:
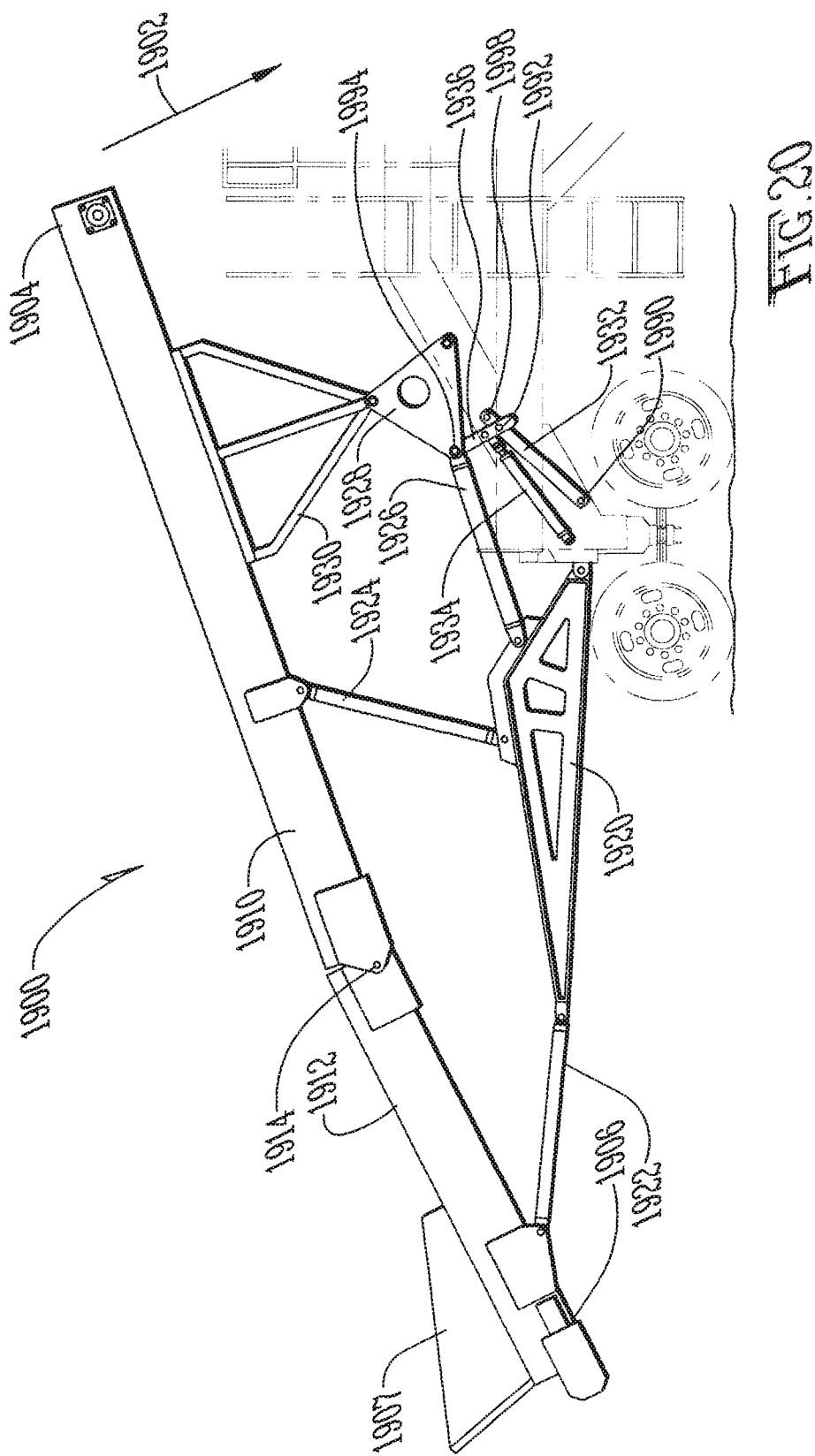
FIG. 20 is an elevation view of a folding conveyor of the present invention disposed next to a hopper or material intake location for receiving material therein. The folding conveyor is shown in an early transitional position.
Figure 21:
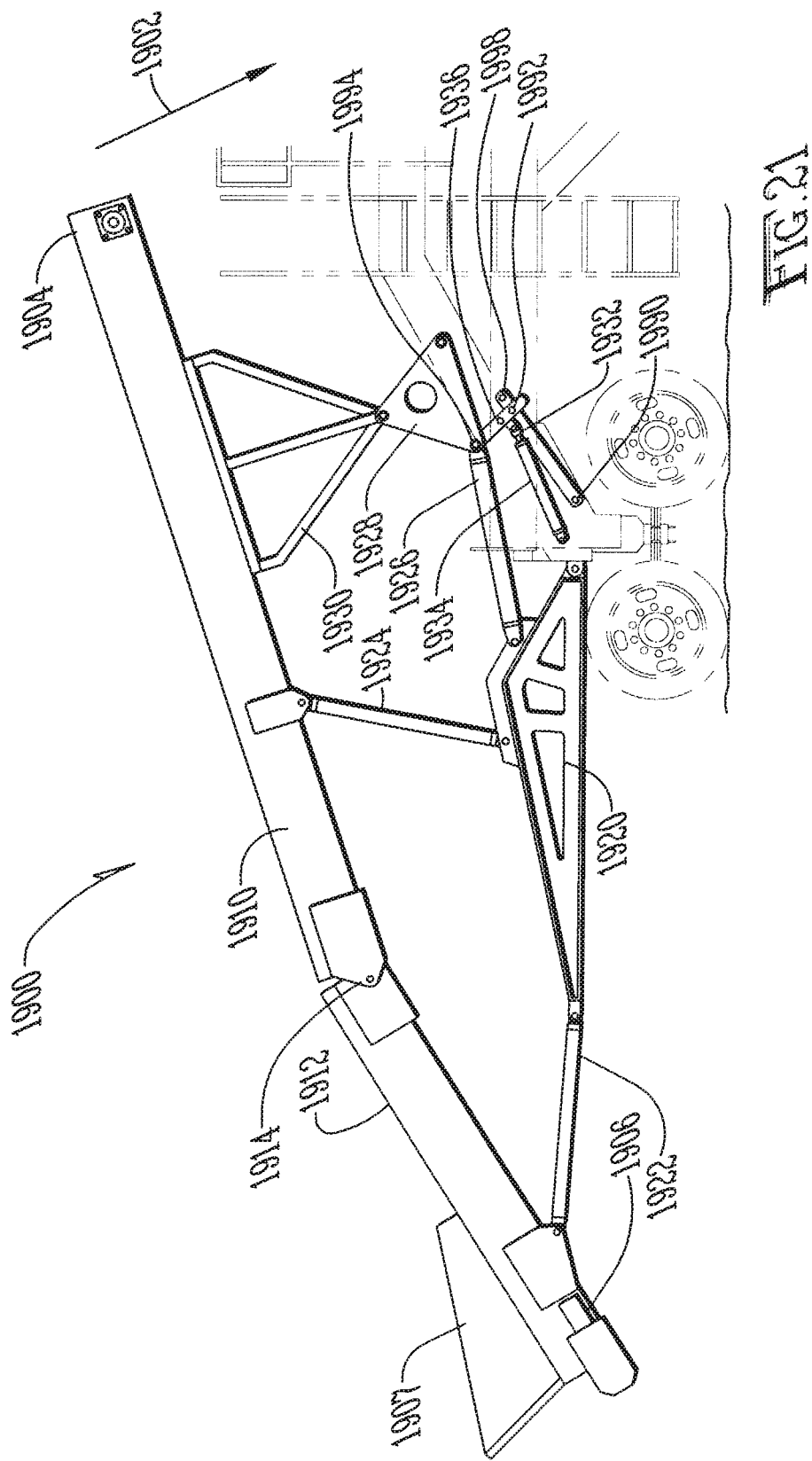
FIG. 21 is an elevation view of a folding conveyor of the present invention disposed next to a hopper for receiving material therein. The folding conveyor is shown in a mid-range transitional position.
Figure 22:
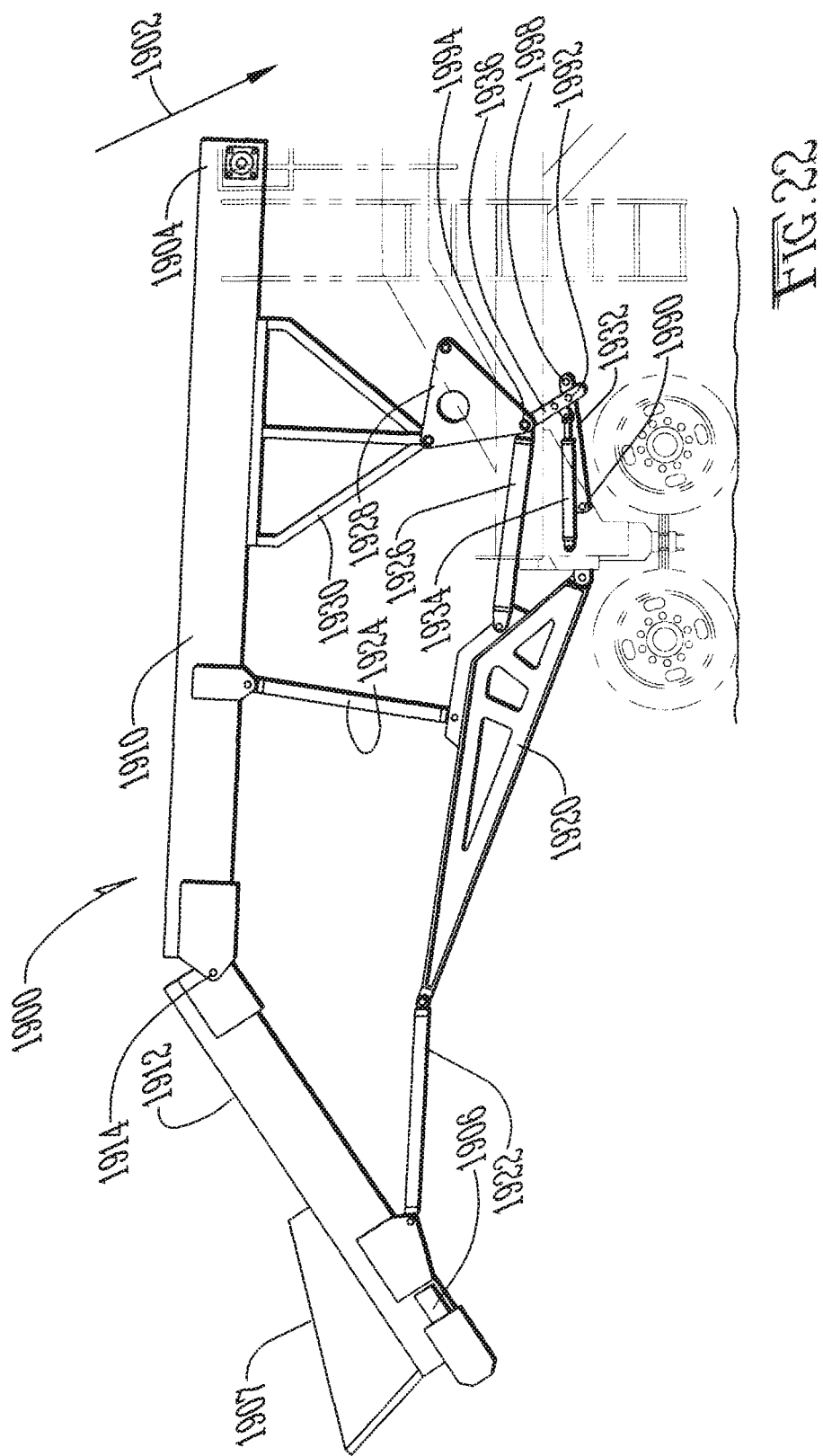
FIG. 22 is an elevation view of a folding conveyor of the present invention disposed next to a hopper for receiving material therein. The folding conveyor is shown in a late transitional position.
Figure 23:
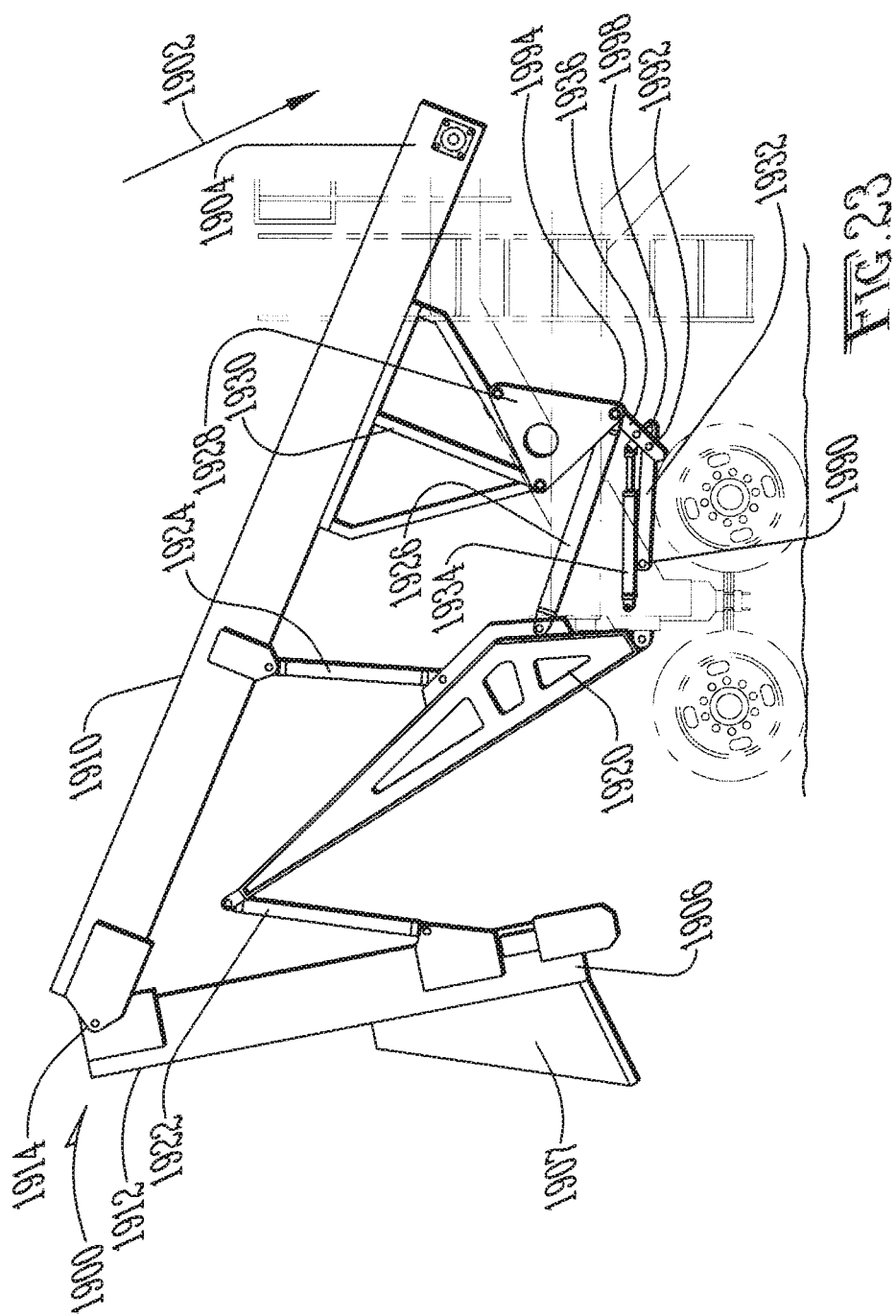
FIG. 23 is an elevation view of a folding conveyor of the present invention disposed next to a hopper for receiving material therein. The folding conveyor is shown in a stowed position.

In FIG. 19, the three pivot points 1990, 1992 and 1994 are in alignment, enabling a retaining pin 1996 to be inserted through a pin receiving hole 1998 (FIG. 20) to lock the folding conveyor 1900 in an operating position.

FIGS. 20-23 show the folding conveyor 1900 in configurations of increasing departure from the operating position of FIG. 19.

Figure 24:
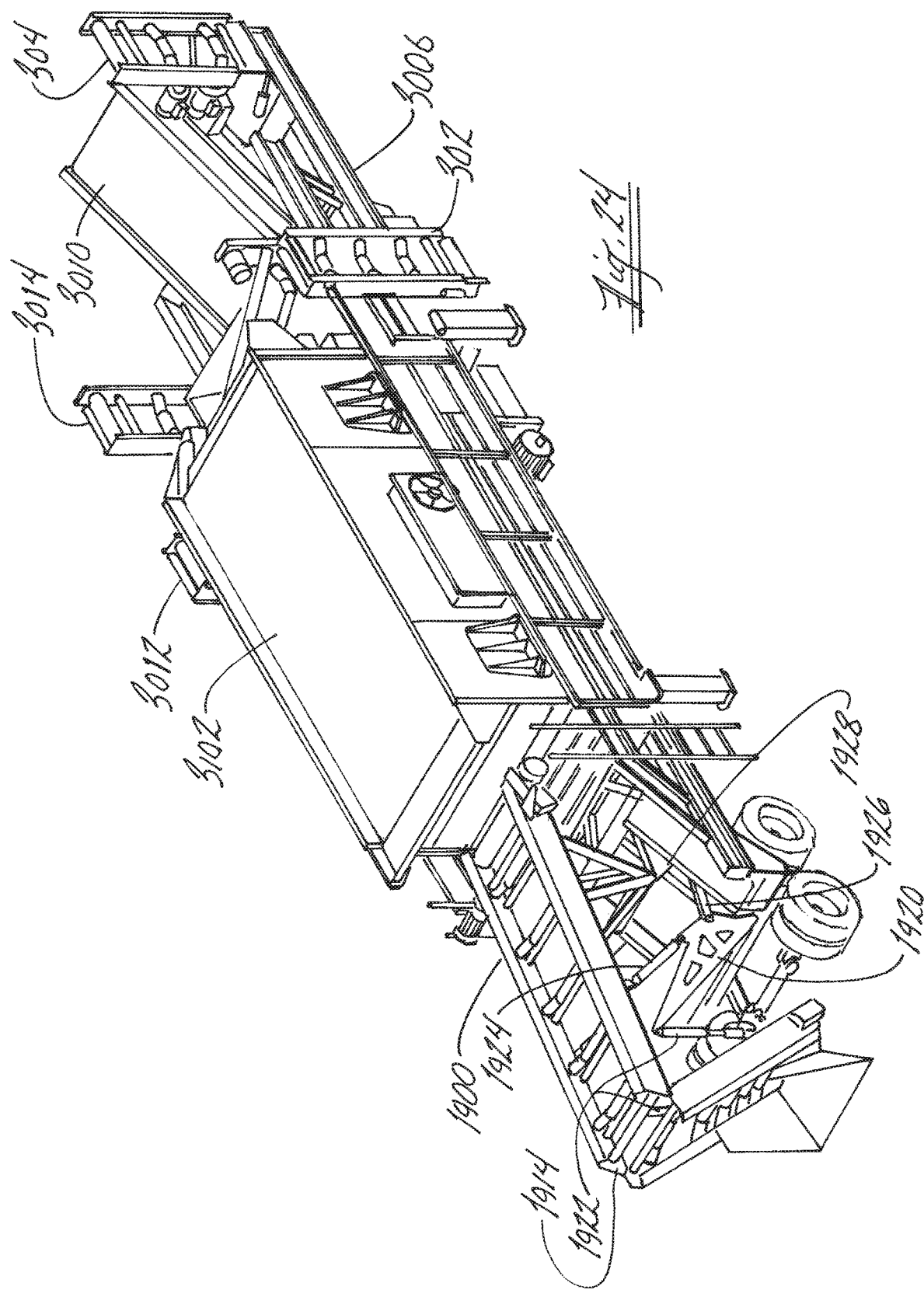
FIG. 24 is a perspective view of a screen of the present invention which is shown configured so as to be able to be towed (i.e., the conveyor of FIGS. 19-23 is fully stowed, as well as other conveyors thereon).

FIG. 24 is a perspective view of the scalping screen 300 shown with the various conveyors stowed.

Figure 25:
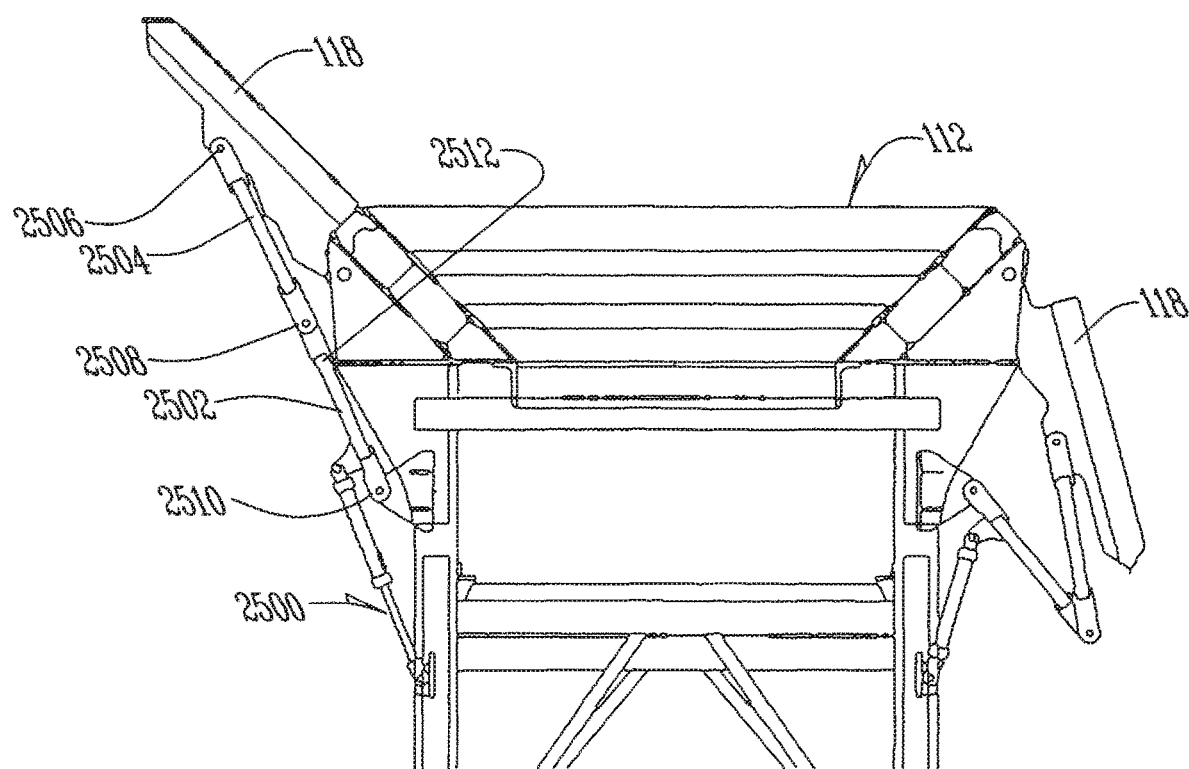
FIG. 25 is an elevation view of a material receiving apparatus with retractable sides, with one shown deployed for use and the other stowed for transport.

FIG. 25 shows the material feeder section input hopper 112 with the material feeder section folding wings 118, where, for illustrative purposes, one material feeder section folding wing is folded down for transport, while the other is deployed in an operating position.

More specifically, there is shown a hydraulic cylinder 2500, which pushes link 2502 beyond a toggle point, which is defined when all three pivot pins 2506, 2508, and 2510 are in alignment, which locks the material feeder section folding wings 118 in place by pushing against an adjustable stop 2512 mounted on the material feeder section input hopper 112 body. When hydraulic cylinder 2500 pushes the links 2502 and 2504 beyond the toggle point, then the weight of the material feeder section folding wings 118 and any load thereon causes the link to move closer to the adjustable stop 2512 without further application of force by the hydraulic cylinder 2500. This results in longer life of the seal in the hydraulic cylinder 2500 and allows for the hydraulic cylinder 2500 to be removed, repaired or replaced while the material feeder section folding wings 118 are deployed in an operating position. To stow the material feeder section folding wings 118, the hydraulic cylinder 2500 pulls the link 2502, which then causes the link 2504 to also move away from the adjustable stop and to a stowed position for transport.

Figure 26:
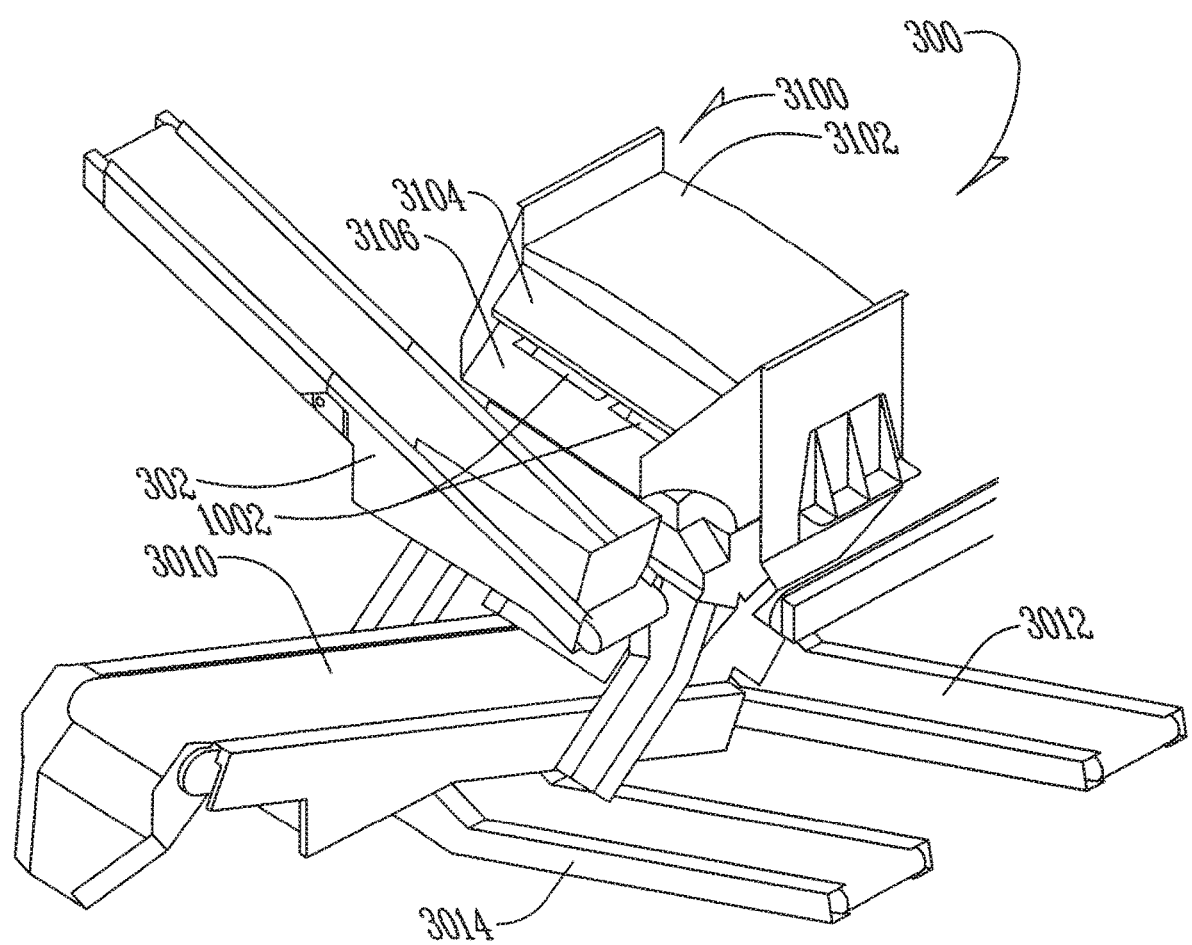
FIG. 26 is a perspective view of a configuration of an output end of a finishing screen of the present invention.
Figure 22:
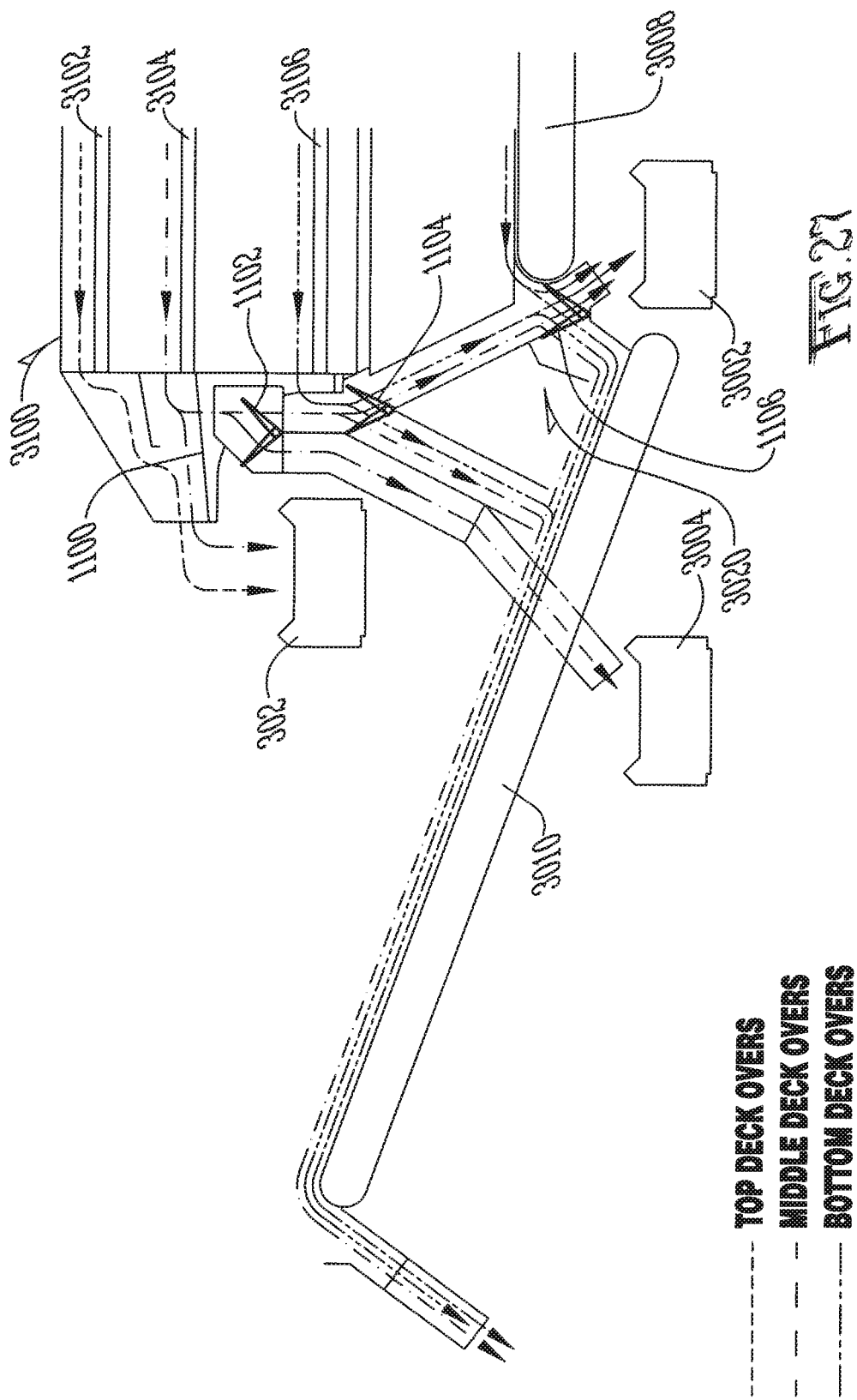

Now referring to FIG. 26, there is shown a perspective view of a configuration of a finishing screen 600 of the present invention with four conveyors, which is similar to the scalping screen 300. Where numerals are used which are common with the scalping screen 300, the differences between the finishing and scalping screens are believed to be minor.

Now referring to FIG. 27, there is shown a finishing screen 600 of FIG. 26, which shows various flows of overs materials from the various decks. Top deck 3102 is shown with an output of top deck over material, which clearly directs such material to the scalping screen to secondary cone input conveyor 302. Overs from mid deck 3104 are directed through first fines blending chute 3020. The sliding swing gate blending assembly 1100 can take the form of four pluggable holes in a floor portion of the discharge lip or other gates of the present invention.

Figure 28:
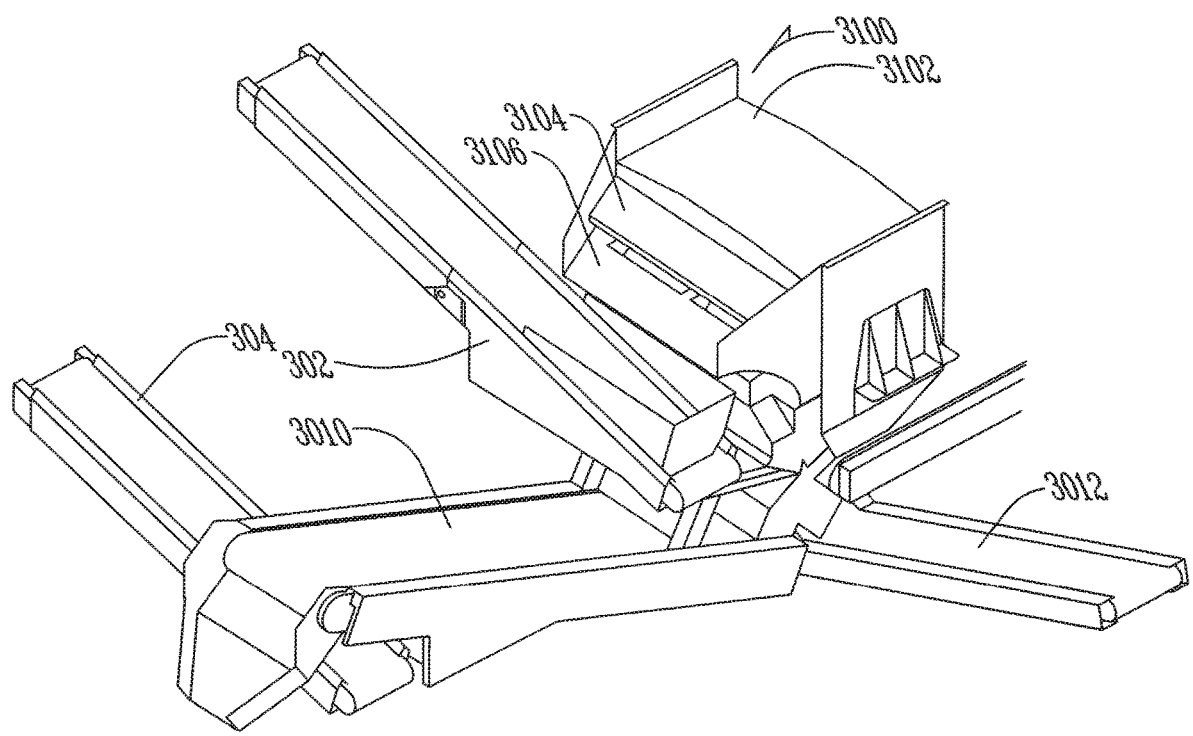
FIG. 28 is a perspective view of a configuration of an output end of a scalping screen of the present invention.

Now referring to FIG. 28, there is shown a perspective view of a configuration of a scalping screen 300 of the present invention with a cone bypass conveyor.

Figure 29:
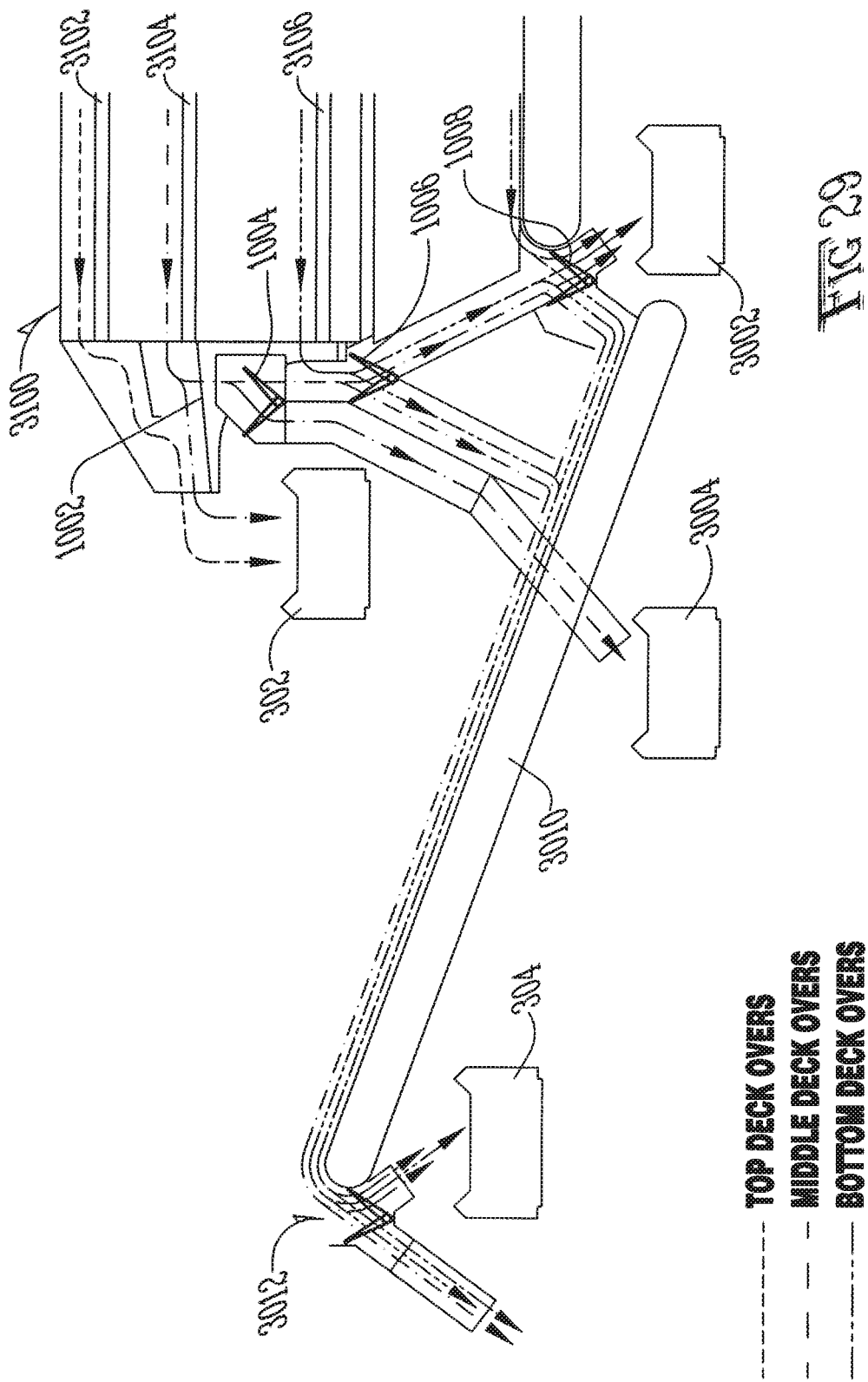
FIG. 29 is a simplified cross-section drawing of the scalping screen of FIG. 28 where the dashed and dotted lines represent flows of material through the scalping screen.

The function of the present invention could be better understood by now referring to FIG. 29. There is shown a scalping screen 300 of FIG. 28, which shows various flows of overs materials from the various decks. The flows from the various decks are shown directed through the gates and on to the scalping screen to secondary cone input conveyor 302 and the secondary cone bypass conveyor 304. Sliding swing gate blending assembly 1002 can take the form of four pluggable holes or other variations of the gates of the present invention.

Since many possible embodiments may be made of the invention without departing from the scope thereof, it is understood that all matter herein set forth or shown in the accompanying drawings is to be interpreted as illustrative and not in a limiting sense.

We claim:

1. A mobile screen comprising:
a plurality of decks for separating aggregate material having differing dimensional characteristics;
aggregate material diverter wherein flow of material therethrough is substantially aided by gravity;
wherein said aggregate material diverter is an adjustable material diverter, capable of dividing input flows therein to a plurality of output flows; said adjustable material diverter comprises: a gate which is configured to move, in a first manner, to block at least portions of a first passage, while permitting aggregate material to flow through a second passage; and said gate further configured to move, in a second manner, across an area below a material flow so that movement of said gate, in said second manner, results in an adjustable percentage of permissible flow through said first passage and said second passage;
a vehicular structure supporting said plurality of decks and said aggregate material diverter; and
wherein said first manner is said pivoting motion and said second manner is said translating motion.

2. A mobile screen comprising:
a plurality of decks for separating aggregate material having differing dimensional characteristics;
aggregate material diverter wherein flow of material therethrough is substantially aided by gravity;
wherein said aggregate material diverter is an adjustable material diverter, capable of dividing input flows therein to a plurality of output flows; said adjustable material diverter comprises: a gate which is configured to move, in a first manner, to block at least portions of a first passage, while permitting aggregate material to flow through a second passage; and said gate further configured to move, in a second manner, across an area below a material flow so that movement of said gate, in said second manner, results in an adjustable percentage of permissible flow through said first passage and said second passage;
a vehicular structure supporting said plurality of decks and said aggregate material diverter;
wherein said gate is a pivotable gate which is configured to block the first passage while permitting aggregate material to flow through the second passage; and
said pivotable gate is further configured to move, in a non-pivoting manner, in an area below a material flow so that a movement of said pivotable gate, in said non-pivoting manner, results in an adjustable percentage of permissible flow through said first passage and said second passage.

3. The mobile screen of claim 2 where said movement of said pivotable gate in said non-pivoting manner is a translating movement.

* * * * *